(12) United States Patent
Gorny et al.

(10) Patent No.: US 11,855,582 B2
(45) Date of Patent: *Dec. 26, 2023

(54) PHOTOVOLTAIC MODULE HAVING BI-DIRECTIONAL COUPLINGS

(71) Applicant: Maxeon Solar Pte. Ltd., Singapore (SG)

(72) Inventors: Lee Gorny, Mountain View, CA (US); Gabriela Elena Bunea, San Jose, CA (US)

(73) Assignee: MAXEON SOLAR PTE. LTD., Singapore (SG)

( * ) Notice: Subject to any disclaimer, the term of this patent is extended or adjusted under 35 U.S.C. 154(b) by 72 days.

This patent is subject to a terminal disclaimer.

(21) Appl. No.: 17/574,064

(22) Filed: Jan. 12, 2022

(65) Prior Publication Data

US 2022/0140777 A1    May 5, 2022

Related U.S. Application Data

(63) Continuation of application No. 16/984,742, filed on Aug. 4, 2020, now Pat. No. 11,239,791, which is a continuation of application No. 16/006,444, filed on Jun. 12, 2018, now Pat. No. 10,763,780.

(60) Provisional application No. 62/525,142, filed on Jun. 26, 2017.

(51) Int. Cl.
*H02S 30/10* (2014.01)
*H02S 40/34* (2014.01)
*H02S 30/00* (2014.01)

(52) U.S. Cl.
CPC .............. *H02S 30/10* (2014.12); *H02S 30/00* (2013.01); *H02S 40/34* (2014.12)

(58) Field of Classification Search
None
See application file for complete search history.

(56) References Cited

U.S. PATENT DOCUMENTS

| 7,487,771 B1 | 2/2009 | Eiffert et al. |
| 7,592,537 B1 | 9/2009 | West |
| 9,518,596 B2 | 12/2016 | West et al. |
| 11,239,791 B2 * | 2/2022 | Gorny ..................... H02S 30/00 |

(Continued)

FOREIGN PATENT DOCUMENTS

| CN | 102956728 A | 3/2013 |
| CN | 103684217 A | 3/2014 |

OTHER PUBLICATIONS

International Search Report and Written Opinion from PCT/US2018/037249 dated Oct. 2, 2018, 14 pgs.

(Continued)

*Primary Examiner* — Eli S Mekhlin
(74) *Attorney, Agent, or Firm* — GRASSO PLLC

(57) ABSTRACT

Photovoltaic module systems are provided. These systems can comprise multiple photovoltaic laminates connected with one or more mechanical coupling pairs that extend beyond perimeter edges of individual photovoltaic laminates. The mechanical coupling pairs can be connected to ends of support members positioned beneath the photovoltaic laminates. During assembly, an additional photovoltaic laminate may be added to connected photovoltaic laminates that are previously connected and lie along a shared plane of reference via pairs of mechanical couplings.

20 Claims, 18 Drawing Sheets

(56) References Cited

U.S. PATENT DOCUMENTS

| | | | |
|---|---|---|---|
| 2005/0126621 A1 | 6/2005 | Dinwoodie et al. |
| 2010/0219304 A1 | 9/2010 | Miros et al. |
| 2011/0000519 A1 | 1/2011 | West |
| 2011/0048505 A1 | 3/2011 | Bunea et al. |
| 2011/0240093 A1 | 10/2011 | Tucker |
| 2013/0125959 A1 | 5/2013 | Sagayama et al. |
| 2014/0182678 A1 | 7/2014 | Chiu |
| 2016/0204731 A1 | 7/2016 | Al-Haddad et al. |
| 2017/0155355 A1 | 6/2017 | Seery |

OTHER PUBLICATIONS

First Action Interview Pre-Interview Communication from U.S. Appl. No. 16/006,444 dated Nov. 8, 2019, 6 pgs.
International Preliminary Report on Patentability from PCT/US2018/037249 dated Jan. 9, 2020, 8 pgs.
First Action Interview Office Action from U.S. Appl. No. 16/006,444 dated Feb. 14, 2020, 4 pgs.
First Office Action from Chinese Patent Application No. 201880042582.6 dated Feb. 24, 2023, pp. 1-12.
Translation of First Office Action from Chinese Patent Application No. 201880042582.6 dated Feb. 24, 2023, pp. 1-12.
Translation of Chinese Patent Application No. CN102956728A, dated Mar. 6, 2013, pp. 1-6.
Translation of Chinese Patent Application No. CN103684217A, dated Mar. 26, 2026, pp. 1-7.

* cited by examiner

PHOTOVOLTAIC MODULE HAVING BI-DIRECTIONAL COUPLINGS

CROSS-REFERENCE TO RELATED APPLICATIONS

This application is a continuation of U.S. patent application Ser. No. 16/984,742, filed on Aug. 4, 2020, and now U.S. Pat. No. 11,239,791, which issued Feb. 1, 2022. The '742 application is a continuation of U.S. patent application Ser. No. 16/006,444, filed on Jun. 12, 2018, and now U.S. Pat. No. 10,763,780, which issued on Sep. 1, 2020. The '444 application claims the benefit of U.S. Provisional Application No. 62/525,142, filed on Jun. 26, 2017, the entire contents of which are hereby incorporated by reference herein.

BACKGROUND

Photovoltaic (PV) cells, commonly known as solar cells, are well known devices for converting solar radiation into electrical energy. Generally, solar cells are fabricated on a semiconductor wafer or substrate using semiconductor processing techniques to form a p-n junction near a surface of the substrate. Solar radiation impinging on the surface of the substrate creates electron and hole pairs in the bulk of the substrate, which migrate to p-doped and n-doped regions in the substrate, thereby generating a voltage differential between the doped regions. The doped regions are coupled to metal contacts on the solar cell to direct an electrical current from the cell to an external circuit coupled thereto. Generally, an array of solar cells, each solar cell interconnected, is mounted on a common or shared platform to provide a PV module. For example, a PV module may include an array of solar cells in a PV laminate. Several PV modules or module groups may be electrically coupled to an electrical power distribution network, forming a PV system.

DETAILED DESCRIPTION

Figure 1:
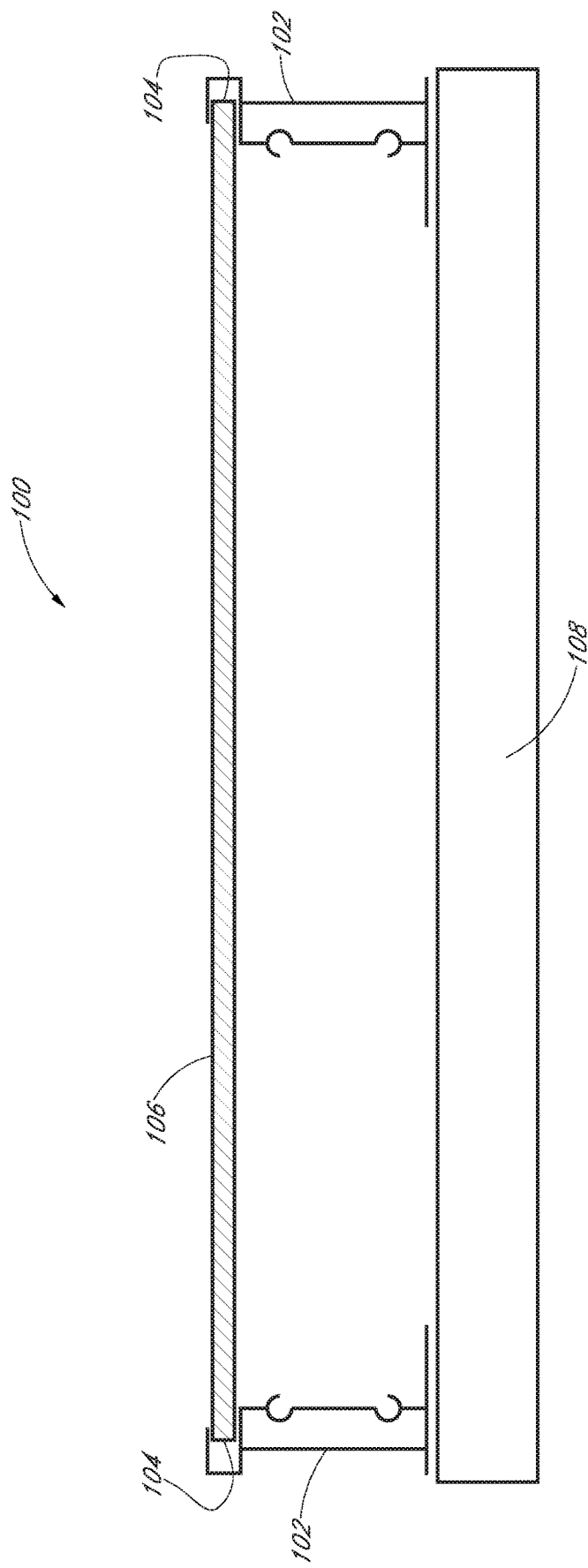
FIG. 1 illustrates a photovoltaic panel supported along an outer edge.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics can be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" edge does not necessarily imply that this edge is the first edge in a sequence; instead the term "first" is used to differentiate this edge from another edge (e.g., a "second" edge).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," "below," "in front of," and "behind" refer to directions in the drawings to which reference is made. Terms such as "front," "back," "rear," "side," "outboard," "inboard," "leftward," and "rightward" describe the orientation and/or location of portions of a component, or describe the relative orientation and/or location between components, within a consistent but arbitrary frame of reference which is made clear by reference to the text and the associated drawings describing the component(s) under discussion. Such terminology may include the words specifically mentioned above, derivatives thereof, and words of similar import.

"Inhibit"—As used herein, inhibit is used to describe a reducing or minimizing effect. When a component or feature is described as inhibiting an action, motion, or condition it can completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

Referring to FIG. 1, a photovoltaic module having a photovoltaic panel supported along an outer edge is illustrated. Existing PV modules 100 include support frames 102 supporting a PV panel 106 along an outer edge 104. Support frames 102 can be mounted on an external structure 108, e.g., a rooftop. Thus, when environmental loading is applied to the PV panel 106, e.g., by pressing downward on PV panel 106, external structure 108 transmits an upward reactive force through support frames 102 to outer edges 104. Accordingly, the environmental load is counteracted by a reactive force distributed along outer edges 104, and PV laminate 106 between outer edges 104 acts like an end-supported beam. That is, PV panel 106 sags under the downward force applied by the environmental loading. More particularly, PV panel 106 can deflect to varying degrees between the supports at outer edges 104. For example, PV panel 106 can have a support deflection, which is an area of minimum deflection, near outer edges 104. Further from outer edges 104, PV panel 106 can have a design deflection. The design deflection can be a deflection having a predetermined factor of safety compared to a maximum deflection that PV laminate 106 may experience prior to cracking. At locations even further from outer edges 104, PV laminate 106 can deflect by the maximum deflection. The maximum deflection can be a deflection at which cracking is statistically likely to occur in PV panel 106. The maximum deflection can correspond to a design load pressing on PV panel 106. By way of example, the design load can be a 6000 Pascal pressure across a face of PV panel 106. The design load can correspond to a uniform snowfall. Real-world loading can, however, differ from the design load, and thus, PV panel 106 can deflect to an over deflection at one or more locations between outer edges 104. The over deflection can be a deflection at which cracking occurs in PV module 106.

To reduce a likelihood of over defection and cracking, PV panel 106 can include a glass-glass laminate having a predetermined thickness. For example, to reduce the likelihood of over deflection in PV panel 106, the glass-glass laminate can be formed with glass sheets having thicknesses less than 3 mm. Such PV panels 106, however, can be costly both to manufacture and to ship to an installation site. Furthermore, glass-glass laminate modules can be particularly difficult to install because handling damage may be more likely to occur. Thus, a lighter PV panel capable of resisting cracking under environmental loading, can provide an improvement over the state of the art.

In an aspect, a PV module assembly, e.g., a residential module system, that is economical, reliable, and easy to install, is provided. The PV module assembly can include PV modules having PV laminates incorporating a front glass sheet and a rear polymer sheet that is less costly to manufacture and ship, as compared to a glass-glass laminate. For example, the PV laminate may incorporate thinner glass, and thus, may be larger and lighter than existing PV panels. To avoid mechanical failure and/or cracking of the larger, lighter PV laminate, the PV module assembly can include a support frame that supports the PV panel across a back surface of the rear polymer sheet. The support frame can have a hash profile. Thus, the PV laminate can have a decreased support span, e.g., between lines of the hash profile, that in turn reduces a deflection of the PV laminate, and reduces a likelihood that PV cells within the PV laminate will crack.

In an aspect, the support frames supporting each PV laminate in the PV module assembly can include bi-directional couplings to attach to adjacent support frames. The PV modules of the assembly can be interconnected in two directions, e.g., in an x-direction and in a y-direction. The bi-directional couplings can include snap and/or tongue-and-groove mechanisms that assemble quickly with no added tools to form tool-less connections, and make installation easier to perform. Furthermore, the interconnected PV modules can support each other in different directions to share loading. The load sharing can reduce a required number of connection points to an external mounting structure, such as a roof, as compared to existing PV module assemblies.

The aspects described above can be realized by the PV module having bi-directional couplings as disclosed herein. In the following description, numerous specific details are set forth, such as specific material regimes and component structures, in order to provide a thorough understanding of embodiments of the present disclosure. It will be apparent to one skilled in the art that embodiments of the present disclosure may be practiced without these specific details. In other instances, well-known fabrication techniques or component structures, such as specific types of mechanical couplings or techniques for laminating PV module components, are not described in detail in order to not unnecessarily obscure embodiments of the present disclosure. Furthermore, it is to be understood that the various embodiments shown in the figures are illustrative representations and are not necessarily drawn to scale.

By way of summary, disclosed herein is a PV module assembly and a PV module having bi-directional couplings. In an embodiment, a PV module includes a PV laminate extending along a lateral plane within a perimeter. The PV module includes a support frame mounted under the photovoltaic laminate. The support frame includes a first support rail extending longitudinally in a first direction to a first outward end, and a second support rail extending longitudinally in a second direction to a second outward end. The first direction is orthogonal to the second direction. The support frame further includes a first coupling mounted on the first outward end, and a second coupling mounted on the second outward end. The first coupling and the second coupling can be male couplings and/or female couplings, and can form male-to-female connections with couplings of an adjacent PV module.

In an embodiment, a PV module assembly includes a keystone module having a support frame including a first coupling under a first edge of a perimeter and a second coupling under a second edge of the perimeter. A first lateral module is mounted on the first coupling, and a second lateral module is mounted on the second coupling. The lateral modules are coupled to the keystone module by male-to-female connections.

In an embodiment, a method of fabricating a PV module assembly having bi-directional couplings includes attaching a first lateral module to a first coupling of a keystone module. The method includes attaching a second lateral module to a second coupling of the keystone module. The modules can be mounted on an external support structure, e.g., a roof, by brackets. In an embodiment, the keystone module is attached to the roof by a greater number of brackets than a number of brackets used to attach the first lateral module and/or the second lateral module to the roof.

Figure 2:
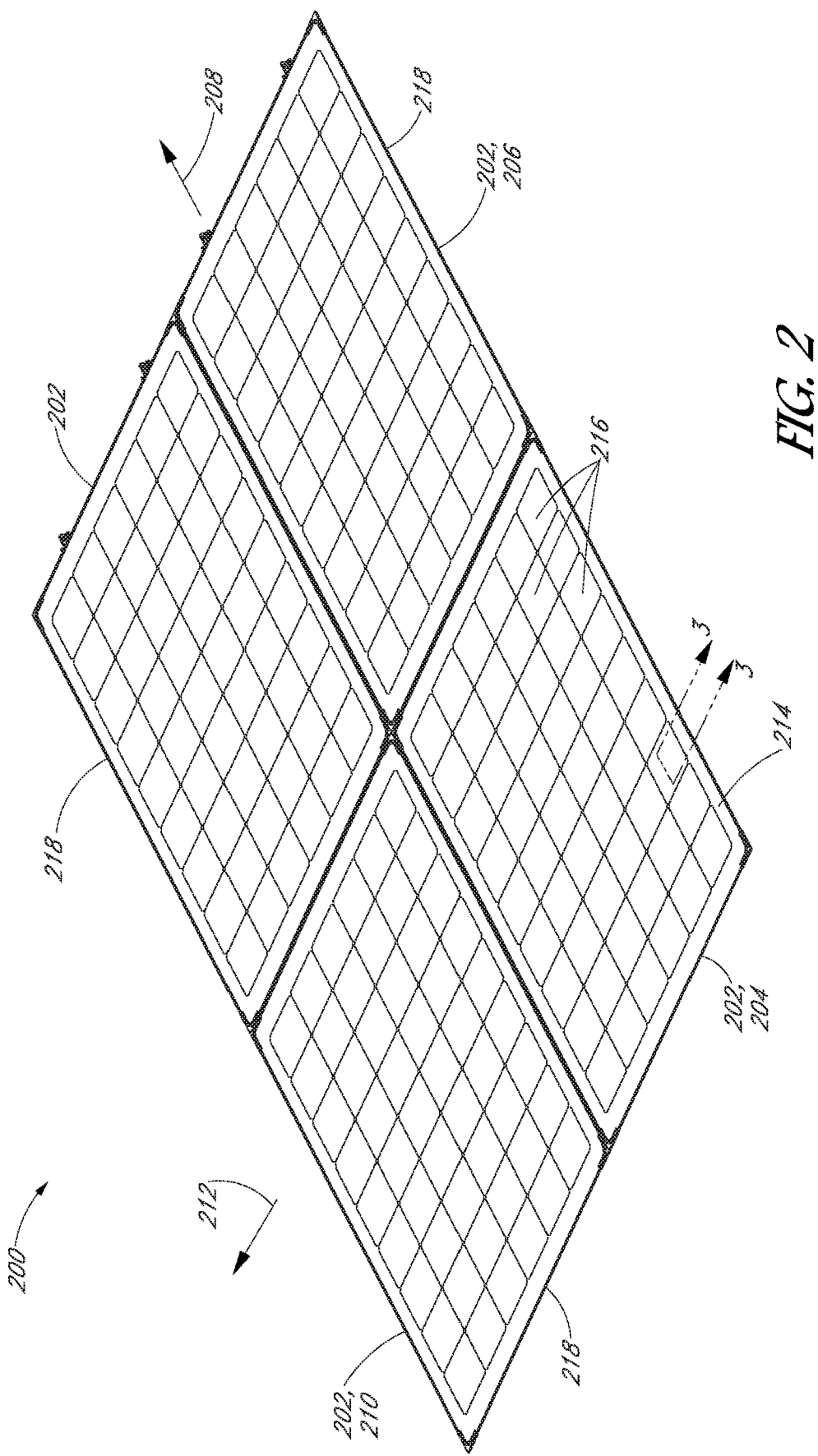
FIG. 2 illustrates a perspective view of a photovoltaic module assembly having bi-directionally connected photovoltaic modules, in accordance with an embodiment of the present disclosure.

Referring to FIG. 2, a perspective view of a photovoltaic module assembly having bi-directionally connected photovoltaic modules is shown in accordance with an embodiment of the present disclosure. A PV module assembly 200 can include one or more PV modules 202 interconnected in several directions. For example, PV module assembly 200 can include a keystone module 204 connected to a first lateral module 206 in an x-direction 208, and keystone module 204 can be connected to a second lateral module 210 in a y-direction 212. "Keystone" module 204 may be so-termed because keystone module 204 may be a first module mounted in an array of modules, and other modules may be mounted on and/or around keystone module 204. The other modules, e.g., first lateral module 206 and second lateral module 210, may rely on keystone module 204 for support. Keystone module 204 may be termed differently, e.g., as an anchor module, a primary module, or a principal module. Keystone module 204 may be an anchor module because keystone module 204 may provide strength or support to other modules in the module array. Keystone module 204 may be a primary module or a principal module because keystone module 204 may be a first module mounted on an external support structure when installing the module array.

As described below, each PV module 202 of PV module assembly 200 can have one or more couplings (not shown) to attach the PV module to an adjacent PV module. For example, first lateral module 206 can be mounted on a first coupling of keystone module 204 and second lateral module 210 can be mounted on a second coupling of keystone module 204. Each coupling can connect support frames of the PV modules together. Accordingly, PV module assembly 200 can include a supporting web of interconnected PV modules 202, and the interconnected modules can share loading and distribute a downward force on an external mounting structure. For example, as described below, PV module assembly 200 can be supported by a roof, and can transmit loading forces to the roof through mounting brackets attached to an underlying support frame. Accordingly, the support frame (and brackets) can hold PV modules 202 above the external mounting structure.

Each PV module 202 in PV module assembly 200 can have a same architecture. For example, each PV module 202 can include a PV laminate 214 having one or more PV cells 216. PV cells 216 can be arranged in a grid, i.e., several row(s) or columns(s), inward from the outer edges of PV module 202. More particularly, PV cells 216 can be electrically connected in one or more PV cell strings laterally inward from the outer edges of PV laminate 214. The outer edges of PV laminate 214 can define a perimeter of PV module 202 around PV cells 216. A combination of outward facing edges of several PV module perimeters in PV module assembly 200 can define an outer perimeter 218 of PV module assembly 200.

Figure 3:
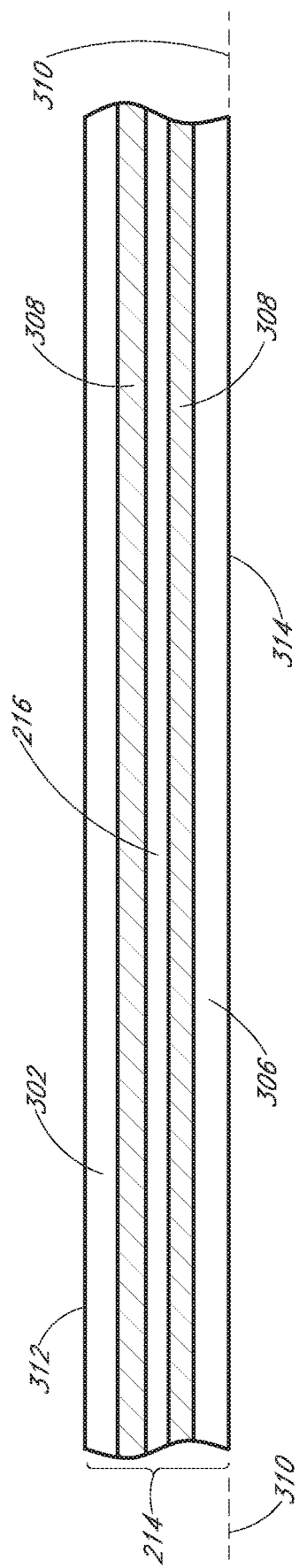
FIG. 3 illustrates a cross-sectional view, taken about line 3-3 of FIG. 2, of a photovoltaic laminate, in accordance with an embodiment of the present disclosure.

Referring to FIG. 3, a cross-sectional view, taken about line 3-3 of FIG. 2, of a photovoltaic laminate is shown in accordance with an embodiment of the present disclosure. PV laminate 214 can include a laminated structure that includes several PV cells 216 between a front layer 302 and a back layer 306. For example, PV cell 216 can be encapsulated between front layer 302 and back layer 306, and an encapsulant 308 can be laminated over PV cell 216 between both front layer 302 and back layer 306. Encapsulant 308 can be a material having excellent adhesion and light transmission characteristics. For example, encapsulant 308 can include a thermoplastic olefin, e.g., polyethylene. Accordingly, encapsulant 308 can bond PV cell 216 to front layer 302 and back layer 306, and can permit light to transmit through front layer 302 or back layer 306 to be captured by PV cell 216 for energy conversion.

Front layer 302 and back layer 306 can be coextensive along parallel transverse planes. More particularly, front layer 302 and back layer 306 can extend along a lateral plane 310 in a transverse direction, e.g., a horizontal direction. Accordingly, PV laminate 214 can extend along lateral plane 310 within a PV module perimeter. Front layer 302 of PV laminate 214 can have a front surface 312 extending transversely between opposite edges of a PV module perimeter, and back layer 306 can have a back surface 314 extending transversely between the opposite edges of the PV module perimeter.

In an embodiment, front layer 302 includes a sheet of transparent material. By way of example, front layer 302 can include a glass sheet. Furthermore, PV cell 216 can include a cell surface facing upward to receive sunlight through front layer 302. Accordingly, sunlight can transmit through front layer 302 to PV cell 216 for energy conversion.

In an embodiment, front layer 302 and back layer 306 are formed from different materials. By way of example, front layer 302 can include a glass sheet and back layer 306 can include a polymer sheet. As such, front layer 302 and back layer 306 can have different elastic modulus. More particularly, front layer 302 can be formed from a first material having a first modulus, and back layer 306 can be formed from a second material having a second modulus. Such a laminate structure can be referred to as an asymmetric laminate structure. In an embodiment, the layers of the asymmetric laminate structure are apt to deflect differently under an external load. For example, the asymmetric laminate structure can distribute stresses disproportionately throughout the laminate cross-section, and thus, the asymmetric laminate structure can flex more under a given load than a typical glass-glass module. Accordingly, the asymmetric laminate structure can benefit from an interconnected support structure that supports back surface 314 of PV laminate 214.

Although front layer 302 and back layer 306 can include different elastic moduli, the layers can alternatively include a same elastic modulus. For example, front layer 302 and back layer 306 can be formed of a same material, e.g., glass-glass or polymer-polymer. In the case of PV module 202 having a polymeric front layer 302 and a polymeric back layer 306, PV module 202 can be a flexible panel. PV module 202 can nonetheless be adequately supported by an interconnected support structure to provide a lightweight and robust PV laminate 214.

Figure 4:
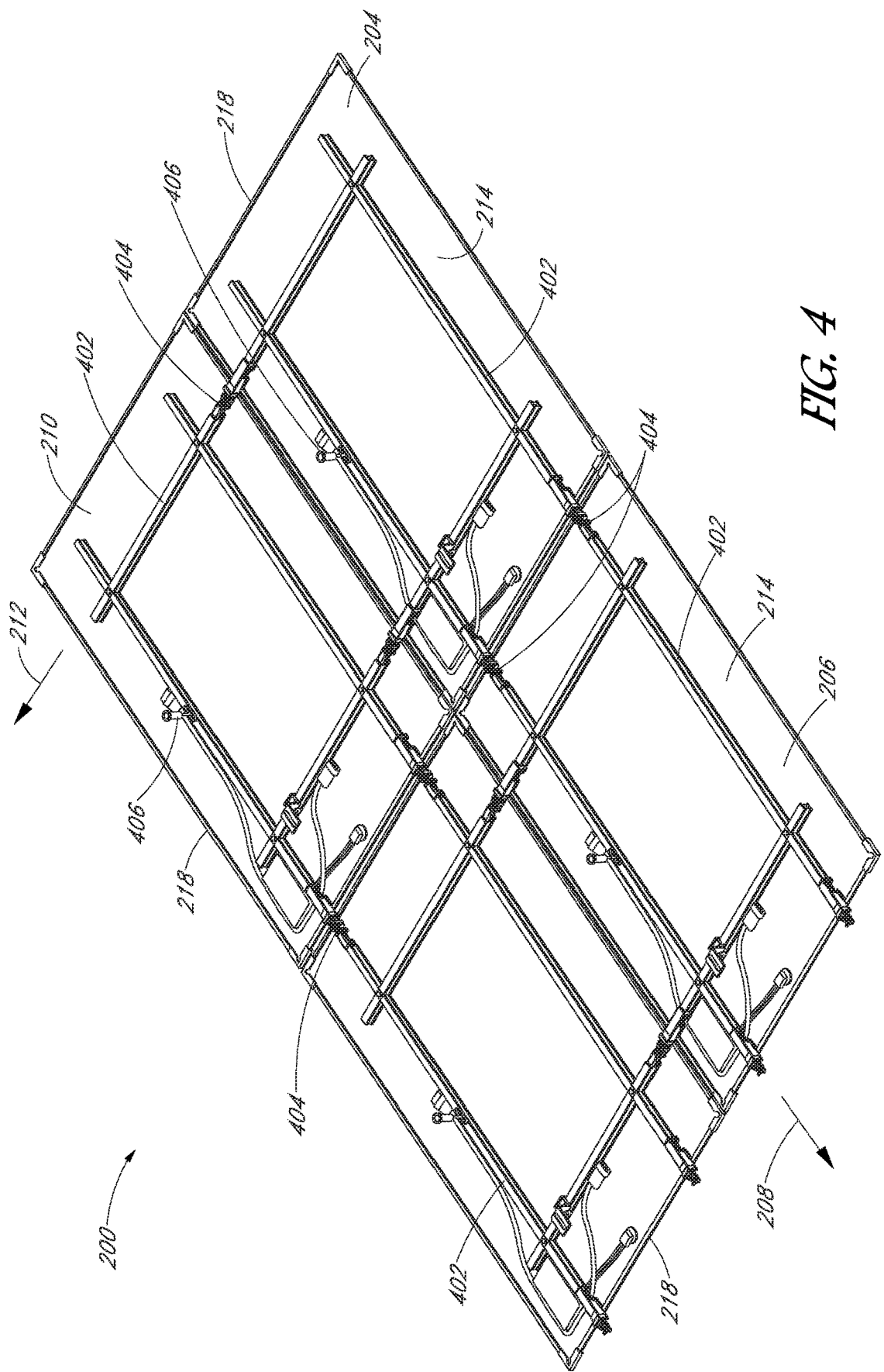
FIG. 4 illustrates a back perspective view of a photovoltaic module assembly having bi-directionally connected photovoltaic modules, in accordance with an embodiment of the present disclosure.

Referring to FIG. 4, a back perspective view of a photovoltaic module assembly having bi-directionally connected photovoltaic modules is shown in accordance with an embodiment of the present disclosure. The interconnected support structure holding PV modules 202 of PV module assembly 200 can include several support frames 402 mounted on respective PV laminates 214. For example, the keystone module 204 can include a first support frame 402 mounted on a first PV laminate 214, and first lateral module 206 can include a second support frame 402 mounted on a second PV laminate 214. Each support frame 402 can be connected to an adjacent support frame 402 by one or more male-to-female connections 404. For example, keystone module 204 can be coupled to first lateral module 206 in the x-direction 208 and second lateral module 210 in the y-direction 212 by respective male-to-female connections 404. The male-to-female connections 404 can include engaging bi-directional couplings, as described below.

PV module assembly 200 can be connected to the external mounting surface by one or more brackets 406. Each bracket 406 can include an upper end mounted on support frame 402, and a lower end attached to the external mounting surface. Bracket 406 can transmit a reaction force upward from the roof to support frame 402. The brackets 406 can be mounted on back surface 314 inward from perimeter 218 extending around assembly 200.

Figure 5:
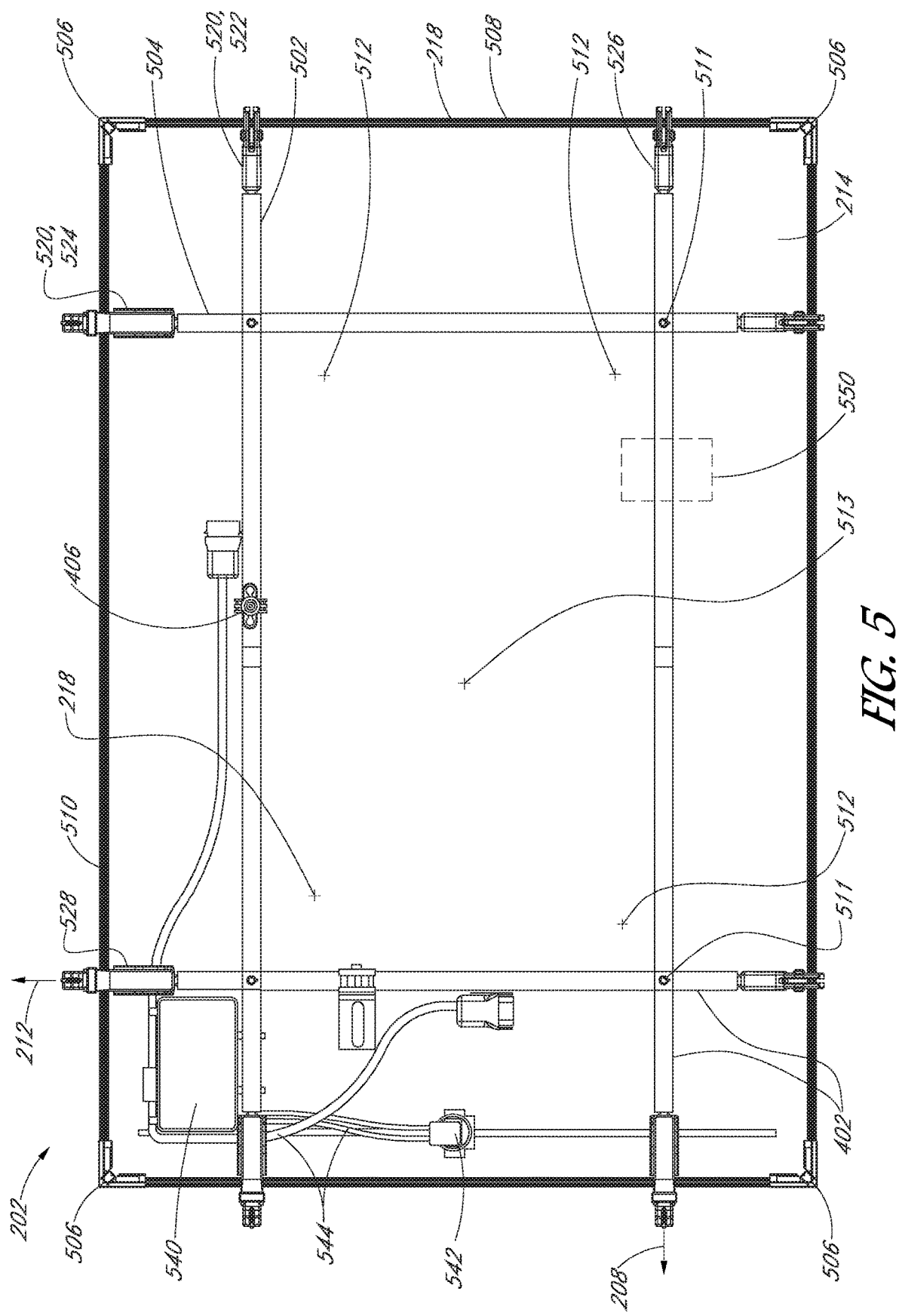
FIG. 5 illustrates a back view of a photovoltaic module having bi-directional couplings, in accordance with an embodiment of the present disclosure.

Referring to FIG. 5, a back view of a photovoltaic module having bi-directional couplings is shown in accordance with an embodiment of the present disclosure. In an embodiment, support frame 402 mounted on back surface 314 of PV laminate 214 includes one or more support rails extending in orthogonal directions. For example, the horizontally oriented support rails can include a first support rail 502 extending longitudinally in a first direction, e.g., x-direction 208, and a second support rail 504 extending longitudinally in a second direction, e.g., y-direction 212. The first direction can be orthogonal to the second direction, and thus, first support rail 502 can be orthogonal to second support rail 504.

Each support rail can extend parallel to a side of perimeter 218. For example, the support rails can be mounted on perimeter 218 to form a perimeter frame (not shown). In an embodiment, the support rails are backsheet-mounted inward from perimeter 218. More particularly, the support rails can be inset from corners 506 of PV module 202, as shown in FIG. 5. The inset support rails can extend parallel to adjacent edges of PV module 202. For example, a first edge 508 of PV module 202 can extend parallel to second support rail 504, and a second edge 510 of PV module 202 can extend parallel to first support rail 502.

In an embodiment, support frame 402 includes at least two support rails extending in x-direction 208 and at least two support rails extending in y-direction 212. The two-axis rail system can have a hash profile, e.g., resembling a hash tag. More particularly, the two-axis rail system can include inset crossing points 511 that form a grid over back surface 314 of PV laminate 214. When support frame 402 includes two support rails in x-direction 208 and two support rails in y-direction 212, the grid has a three-by-three grid profile, similar to a profile of a tic-tac-toe grid.

Crossing points 511 of support frame 402 can be laterally inward from corners 506, and can be laterally outward from a central point 513 of PV laminate 214. By way of example, back surface 314 can have quarter points 512, and crossing points 511 can be between a respective quarter point 512 and corner 506a long a line radiating from central point 513. Each quarter point 512 can be defined as a center of a quadrant of back surface 314. More particularly, the quarter point 512 in the upper-right region of PV laminate 214 in FIG. 5 can be separated from first edge 508 of perimeter 218 by a distance equal to a module width divided by four. Similarly, the same quarter point 512 can be separated from second edge 510 of perimeter 218 by a distance equal to a module height divided by four. Accordingly, in the case of a square PV laminate 214, each quarter point 512 can be equidistant from central point 513 (at a center of PV laminate 214) and a respective corner 506.

A distance between crossing points 511 can determine a distance between adjoined support rails, and thus, relates to a maximum unsupported span of PV laminate 214. As such, crossing points 511 can be located to balance an unsupported region in a central portion of the grid profile and an unsupported region laterally outward from the central portion. In an embodiment, each crossing point 511 is located such that a diagonal distance between crossing points 511, e.g., between the upper-right crossing point 511 and the lower-left crossing point 511, is in a range of 0.8-0.85 of a total length between opposite corners 506, e.g., between the upper-right corner 506 and the lower-left corner 506. It will be appreciated that the description of quarter points 512 and crossing points 511 is offered by way of example, and crossing points 511 can be located anywhere along back surface 314 to provide a backsheet-mounted support structure for PV laminate 214.

Support rail segments extending between crossing points 511 can support PV laminate 214 as an end-supported beam. By contrast, support rail segments laterally outward of crossing points 511 can support PV laminate 214 as cantilever beams. A cantilever beam is stronger than an end supported beam so strength of support frame 402 can be increased by moving crossing points 511 inboard from perimeter 218. Further enhancement of the cantilevered beam can be achieved by coupling each cantilever beam portion of support frame 402 to an adjacent cantilever beam portion of an adjacent PV module 202. To facilitate these connections, PV module 202 can include several couplings 520.

One or more couplings 520 can be mounted under each edge of PV module 202. For example, perimeter 218 can have first edge 508 and second edge 510, and second edge 510 can be orthogonal to first edge 508. In an embodiment, a first coupling 522 can be mounted on first support rail 502, and a second coupling 524 can be mounted on second support rail 504. For example, first coupling 522 of support frame 402 can be under first edge 508, and second coupling 524 of support frame 402 can be under second edge 510. The couplings 520 can be mounted on support rails, or can be integrally formed with support rails of support frame 402. Support frame 402 of PV module 202, e.g., keystone module 204, can include additional couplings 520 along one or more edges. For example, third coupling 526 of support frame 402 can be under first edge 508, and fourth coupling 528 of support frame 402 can be under second edge 510.

In addition to PV laminate 214, support frame 402 can also support components attached to PV laminate 214. For example, electronic components such as a microinverter 540, a junction box 542, power optimizer (e.g., a DC optimizer), and/or an electrical cable 544 can be mounted on back surface 314 of PV laminate 214. A weight of the electronic components can be supported by support frame 402 under PV laminate 214.

Weights and loading exerted on support frame 402 can be transmitted to the external mounting surface through one or more bracket 406, as described above. More particularly, each PV module 202 of PV module assembly 200 can include one or more brackets 406. Brackets 406 can attach anywhere along respective support rails. As shown, bracket 406 can be mounted under first support rail of PV module 202. Similarly, additional brackets 406 can be mounted on first support rail 502 or another support rail of support frame 402. For example, a bracket 406 can be located at an optional bracket location 550 of a different support rail.

A number of brackets 406 can vary from PV module to PV module in PV module assembly 200. For example, keystone module 204 can include a first number of brackets 406, e.g., two or three brackets, and one or more of first lateral module 206 or second lateral module 210 can have a different number of brackets 406, e.g., one bracket. In an embodiment, keystone module 204 has more brackets than the lateral modules because it is an initial module of PV module assembly 200. More particularly, keystone module 204 can be a first module mounted on the external mounting surface, and thus, can be attached to the external mounting surface by the more numerous first number of brackets 406 to space the module apart from the roof. By contrast, subsequent modules, such as first lateral module 206 and second lateral module 210, can be attached to the external mounting surface by the fewer second number of brackets (or third number of brackets). The number of brackets attaching the lateral modules to the external supporting surface can be fewer than the first number of brackets because the subsequent modules gain support through their attachments to keystone module 204. More attachments can be needed to stabilize the initial modules in the array, and fewer attachments can be needed subsequently.

Figure 6:
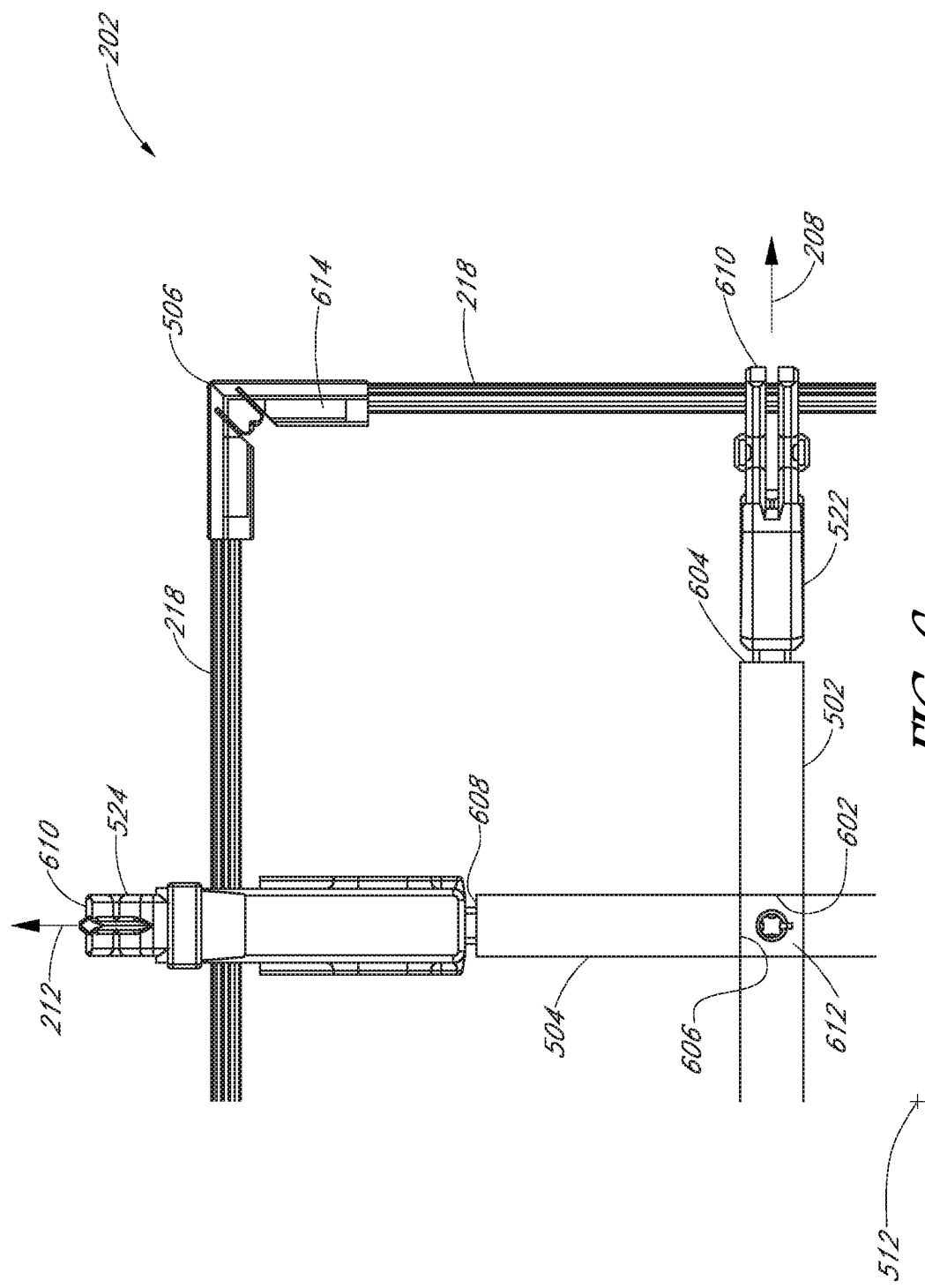
FIG. 6 illustrates a back view of a corner region of a photovoltaic module having bi-directional couplings, in accordance with an embodiment of the present disclosure.

Referring to FIG. 6, a back view of a corner region of a photovoltaic module having bi-directional couplings is shown in accordance with an embodiment of the present disclosure. Each elongated support rail can extend between respective ends. For example, first support rail 502 can be a rail segment extending longitudinally in first direction from a first inward end 602 to a first outward end 604. Similarly, second support rail 504 can be a rail segment extending longitudinally in second direction from a second inward end 606 to a second outward end 608.

The outward ends of each support rail can support respective bi-directional couplings 520. For example, first coupling 522 can be mounted on first outward end 604, and second coupling 524 can be mounted on second outward end 608. Each coupling 520 can be attached to the respective outward end, and can extend laterally outward toward a respective coupling tip 610. For example, first coupling 522 can be attached to first outward end 604 laterally inward of perimeter 218, and first coupling 522 can extend to a coupling tip 610 laterally outward of perimeter 218. Second coupling 524 can similarly extend from second outward end 608 (inward of perimeter 218) to a respective coupling tip 610.

In an embodiment, inward ends of the support rails are interconnected by a rail coupler 612. For example, rail coupler 612 can couple first support rail 502 to second support rail 504. First support rail 502 can extend between first outward end 604 and first inward end 602 at rail coupler 612, and second support rail 504 can extend between second outward end 608 and second inward end 606 at rail coupler 612. Rail coupler 612 can interconnect first inward end 602 to second inward end 606. Similar rail couplers 612 can be located at each crossing point 511 to connect individual segments of support frame 402. More particularly, the hash architecture of support frame 402 can be fabricated by interconnecting rail segments at rail couplers 612. Rail coupler 612 structure can be any structure that attaches fastens several rails together. An example of a rail coupler 612 structure is described below with respect to FIG. 19.

In an embodiment, PV module 202 and/or PV laminate 214 includes corner 506 along perimeter 218. Corner 506 can be laterally outward of quarter point 512 at a location where first edge 508 and second edge 510 meet. More particularly, quarter point 512 can be laterally inward of corner 506. As described above, rail coupler 612 can be located at crossing point 511 of support frame 402, and thus, rail coupler 612 can be mounted on PV laminate 214 laterally between quarter point 512 and corner 506.

In an embodiment, PV module 202 includes an edge protector 614 mounted on corner 506. Edge protector 614 can be a molded polymer cover to protect corner 506 of PV laminate 214 against impacts during shipment and installation. As described below with respect to FIG. 21, edge protector 614 can include vertical interlock features to maintain a relative lateral position between stacked PV modules 202 during shipment.

Couplings 520 of PV module 202 are interleaving connecting pieces that can attach to each other to rapidly couple adjacent PV modules 202 in several directions. The attachments between couplings 520 can be any kind of mechanical fastening mechanism. For example, couplings 520 can snap together and/or couplings 520 can assemble in a tongue-and-groove fashion. Such couplings 520 are described below, however, it will be appreciated that any mechanical fastening mechanism can be used to interconnect keystone module 204 to first lateral module 206 in x-direction 208 and to second lateral module 210 in y-direction 212. For example, support frame 402 under keystone module 204 can be coupled to support frame 402 under first lateral module 206 by connecting a first end of a tension rod to the keystone module frame and a second end of the tension rod to the lateral module frame. Accordingly, the male-to-female connections described below are illustrative and non-limiting.

Figure 7:
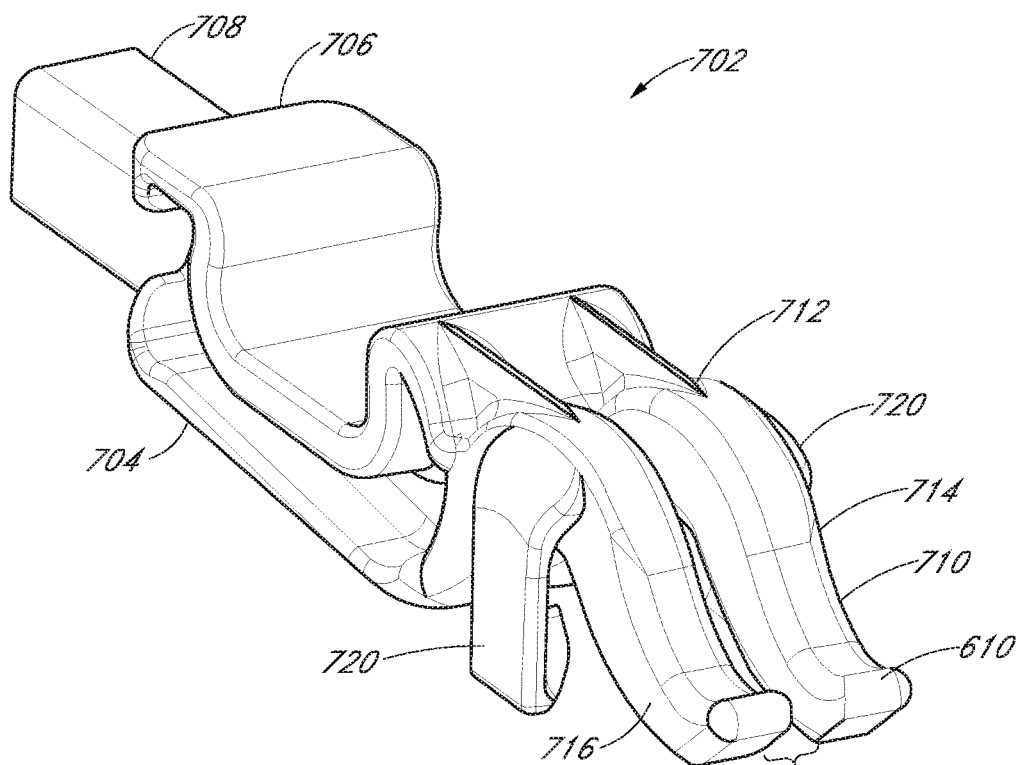
FIG. 7 illustrates a perspective view of a male coupling, in accordance with an embodiment of the present disclosure.

Referring to FIG. 7, a perspective view of a male coupling is shown in accordance with an embodiment of the present disclosure. A coupling 520, e.g., first coupling 522, can be a male coupling 702. Male coupling 702 can be so-named because the coupling can engage a female coupling as described below to form male-to-female connection 404.

In an embodiment, male coupling 702 includes a coupling base 704. Coupling base 704 can be a portion of male coupling 702 that mounts on first outward end 604. For example, a proximal end 706 of coupling base 704 can be located adjacent to first outward end 604. A coupler insert 708 can extend laterally from proximal end 706. Coupler insert 708 can be mounted inside of a support rail. For example, first support rail 502 can have a tubular structure as described below with respect to FIG. 20, and coupler insert 708 can be press fit or threaded into the tubular structure to secure coupling base 704 to first outward end 604.

Male coupling 702 can include a tongue 710 extending laterally outward from coupling base 704 to coupling tip 610. In an embodiment, tongue 710 extends distally from coupling base 704. Tongue 710 can extend along a curvilinear path, as shown. More particularly, tongue 710 can arc forward from a tongue base 712 at coupling base 704 to coupling tip 610. In an embodiment, tongue 710 has several transversely separated portions. More particularly, tongue 710 can have a first tongue portion 714 separated from a second tongue portion 716 in a transverse direction by a coupling channel 718. Coupling channel 718 can be a vertical gap between first tongue portion 714 and second tongue portion 716. Coupling channel 718 can be configured to receive a corresponding feature of a female coupling, as described below.

In an embodiment, male coupling 702 includes several clip walls 720 extending from tongue 710. For example, a first clip wall 720 can extend vertically downward from first tongue portion 714, and a second clip wall 720 can extend vertically downward from second tongue portion 716.

Figure 8:
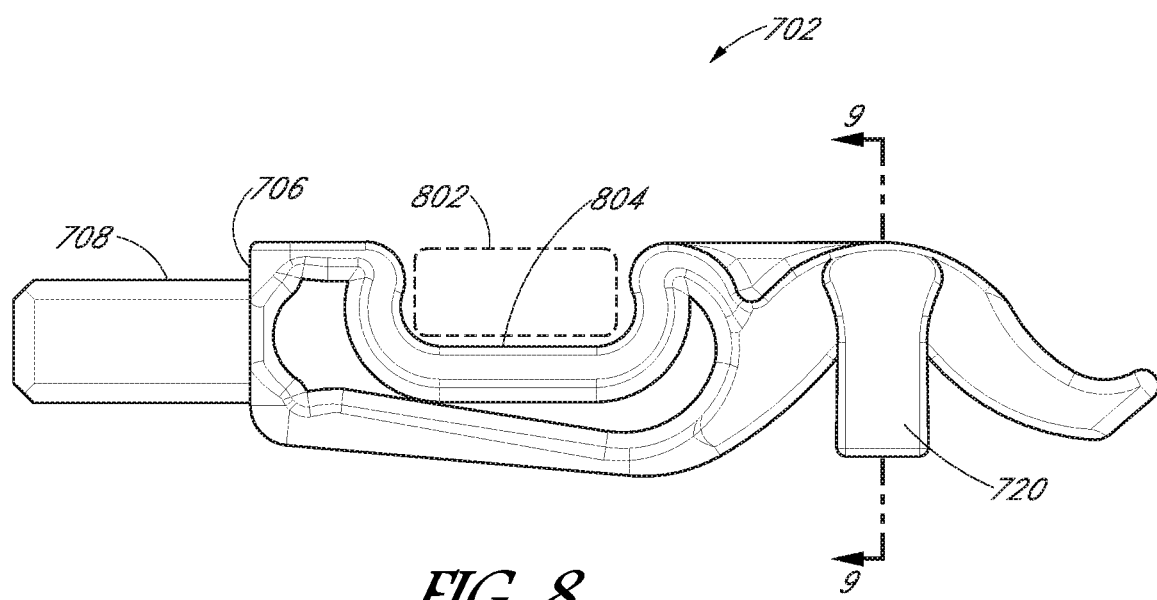
FIG. 8 illustrates a side view of a male coupling, in accordance with an embodiment of the present disclosure.

Referring to FIG. 8, a side view of a male coupling is shown in accordance with an embodiment of the present disclosure. Male coupling 702 can include a cable management channel 802 to receive electrical cable(s) 544 mounted on PV laminate 214. For example, coupling base 704 of male coupling 702 can include an upper surface 804 forming a recess below an uppermost horizontal plane. Cable management channel 802 can be within the recess between upper surface 804 and PV laminate 214 (not shown). Electrical cable 544 can extend through cable management channel 802 to cross from one grid of back surface 314 on a first side of a support rail to another grid on back surface 314 on an opposite side of the support rail. More particularly, upper surface 804 of coupling base 704 can support cables being held within cable management channel 802. Electrical cable 544 can be electrically connected to PV cell 216 and/or microinverter 540 to carry electrical power along back surface 314.

Figure 9:
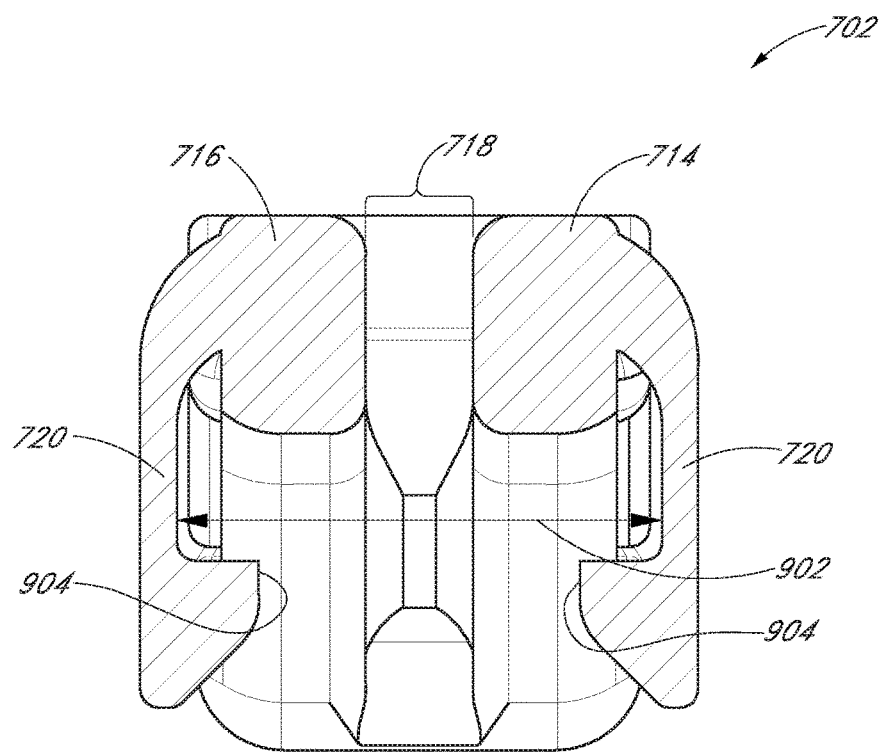
FIG. 9 illustrates a cross-sectional view, taken about line 9-9 of FIG. 8, of a male coupling, in accordance with an embodiment of the present disclosure.

Referring to FIG. 9, a cross-sectional view, taken about line 9-9 of FIG. 8, of a male coupling is shown in accordance with an embodiment of the present disclosure.

Clip walls 720 extending from tongue portion 714, 716 can define a clip channel 902 to receive a portion of a female coupling, as described below. More particularly, clip channel 902 can be a gap between clip walls 720 in a transverse direction to a longitudinal axis of male coupling 702. Male coupling 702 can include clip teeth 904 extending transversely inward from clip walls 720 below clip channel 902. Clip teeth 904 include inward ledges to can hook around a corresponding feature of a female coupling, e.g., around a locking knuckle, as described below.

Figure 10:
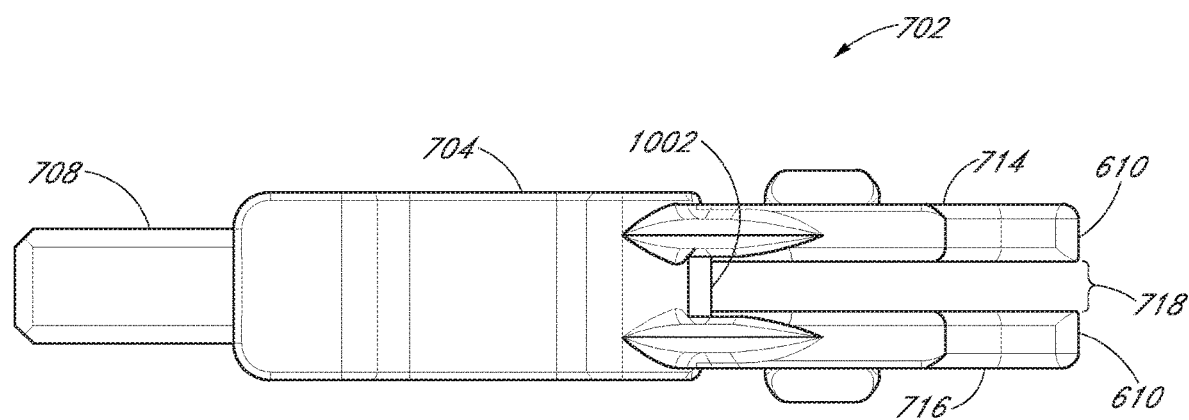
FIG. 10 illustrates a top view of a male coupling, in accordance with an embodiment of the present disclosure.

Referring to FIG. 10, a top view of a male coupling is shown in accordance with an embodiment of the present disclosure. The top view shows that, in an embodiment, coupling channel 718 extends longitudinally from a distal end 1002 of coupling base 704 to coupling tips 610 of first tongue portion 714 and second tongue portion 716. Tongue 710 is illustrated as having two portions, however, tongue 710 can be a single longitudinally extending protrusion. More particularly, male coupling 702 may not include coupling channel 718 within tongue 710. It will be appreciated, however, that splitting tongue 710 into several portions allows male coupling 702 to receive a corresponding portion of a female coupling, as described below, which can increase an alignment and rigidity of male-to-female connection 404 formed between male coupling 702 on one PV module 202 and a female coupling on another PV module 202.

Figure 11:
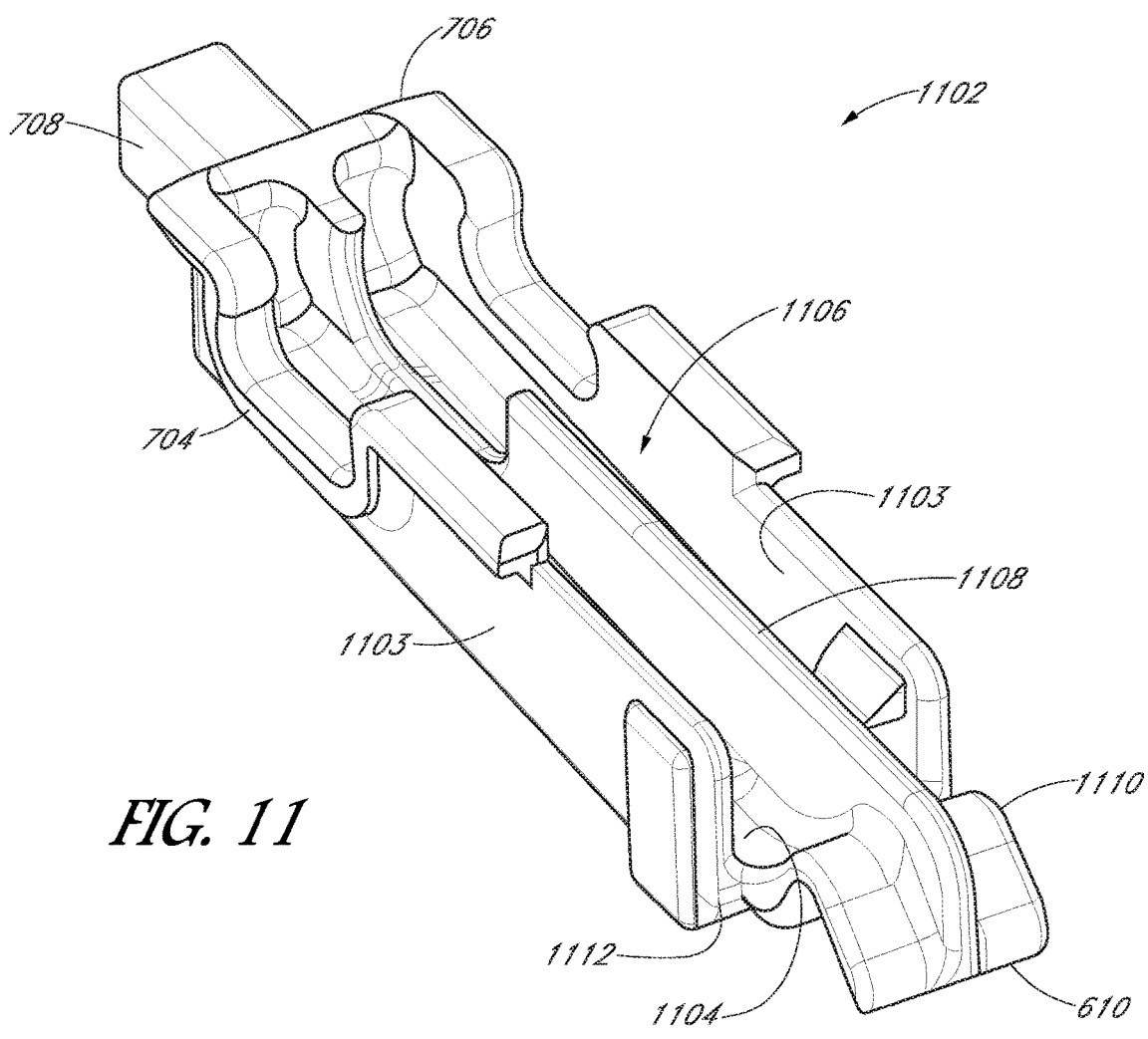
FIG. 11 illustrates a perspective view of a female coupling, in accordance with an embodiment of the present disclosure.

Referring to FIG. 11, a perspective view of a female coupling is shown in accordance with an embodiment of the present disclosure. A coupling 520, e.g., first coupling 522, can be a female coupling 1102. Female coupling 1102 can include some portions similar to the portions of male coupling 702 described above. For example, female coupling 1102 can include coupling base 704 having proximal end 706. Coupling base 704 can be mounted on first outward end 604, e.g., by inserting coupler insert 708 into a receiving channel of first support rail 502.

In an embodiment, female coupling 1102 includes several receiving walls 1103 extending from coupling base 704. More particularly, receiving walls 1103 can be vertical walls separated in a transverse direction by a gap. The receiving walls 1103 can extend upward from a receiving floor 1104. Receiving floor 1104 can extend transversely between walls 1103. Thus, the gap can provide a receiving channel 1106 between receiving walls 1103 and above receiving floor 1104. In an embodiment, tongue 710 of male coupling 702 can be inserted into receiving channel 1106. More particularly, tongue 710 can slide over receiving floor 1104 to rest within the channel between receiving walls 1103 of female coupling 1102.

In addition to having channels to receive corresponding features of male coupling 702, female coupling 1102 can have features to insert into corresponding features of male coupling 702. For example, female coupling 1102 can include an insert wall 1108 extending upward from receiving floor 1104 within channel 1106. Insert wall 1108 can insert into coupling channel 718 when tongue 710 of male coupling 702 is loaded into receiving channel 1106 of female coupling 1102.

In an embodiment, female coupling 1102 includes a locking knuckle 1110 extending from receiving walls 1103. Locking knuckle 1110 can extend forward along a curvilinear path similar to the arcuate shape of tongue 710. More particularly, locking knuckle 1110 can extend along an arcing profile from a knuckle base 1112 to coupling tip 610.

Figure 12:
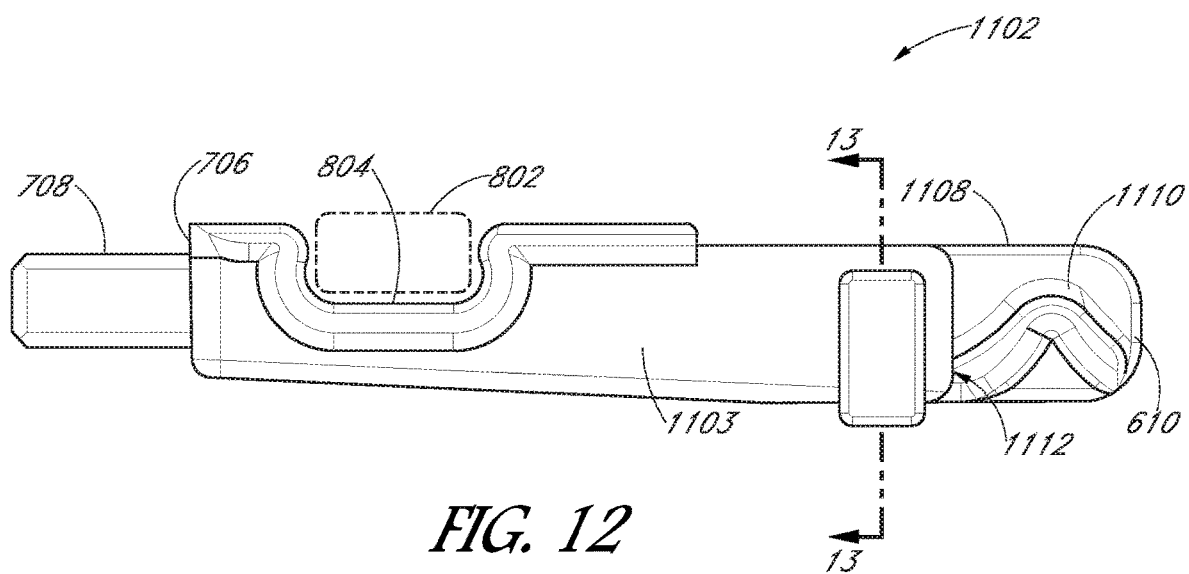
FIG. 12 illustrates a side view of a female coupling, in accordance with an embodiment of the present disclosure.

Referring to FIG. 12, a side view of a female coupling is shown in accordance with an embodiment of the present disclosure. Female coupling 1102 can include a cable management channel 802 to receive electrical cable(s) 544 mounted on PV laminate 214. For example, coupling base 704 of female coupling 1102 can include a vertical recess in upper surface 804, and cable management channel 802 can be between upper surface 804 and PV laminate 214 (not shown).

Figure 13:
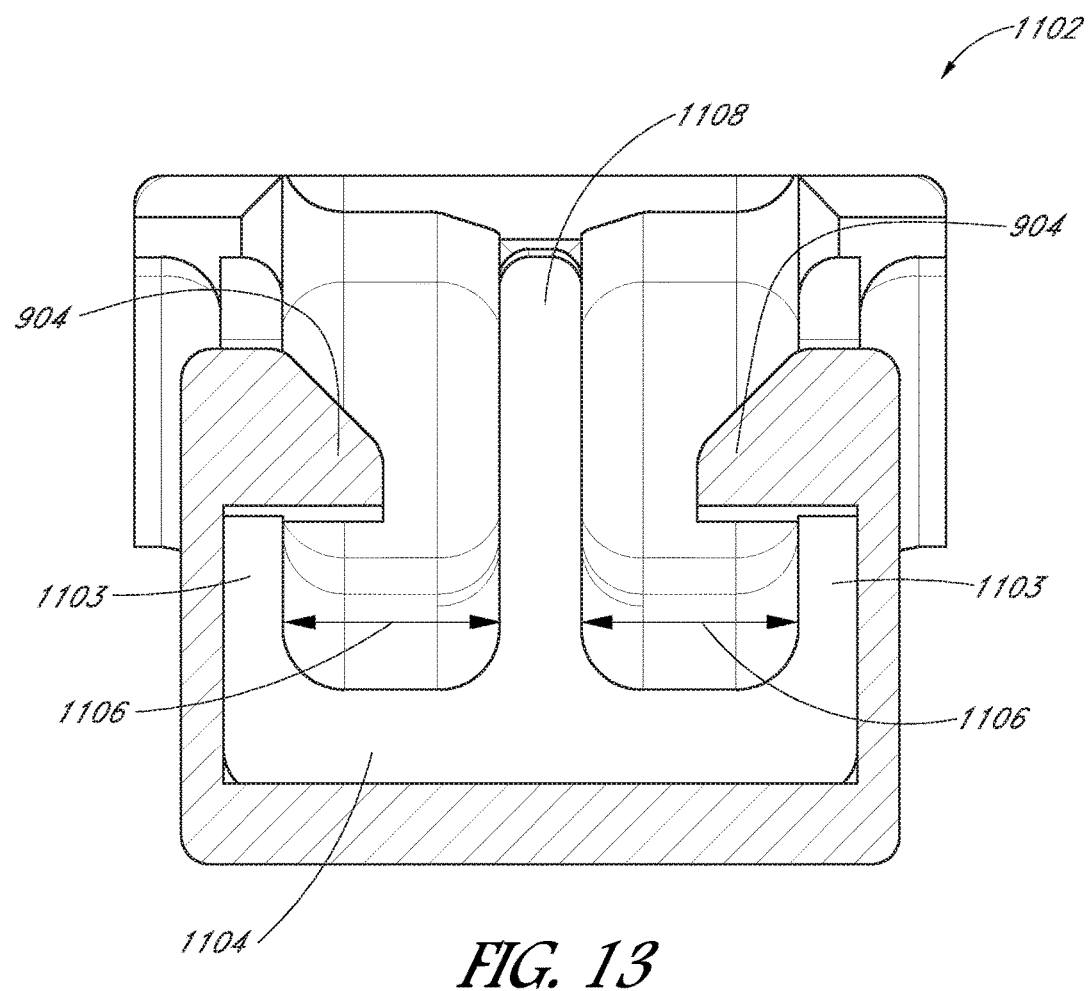
FIG. 13 illustrates a cross-sectional view, taken about line 13-13 of FIG. 12, of a female coupling, in accordance with an embodiment of the present disclosure.

Referring to FIG. 13, a cross-sectional view, taken about line 13-13 of FIG. 12, of a female coupling is shown in accordance with an embodiment of the present disclosure. Receiving walls 1103 extending from receiving floor 1104 define receiving channel 1106 to receive a tongue portion of male coupling 702. More particularly, receiving channel 1106 can include one or more gaps between receiving walls 1103 in a transverse direction relative to a longitudinal axis of female coupling 1102. Receiving channel 1106 can include a first gap between a leftward receiving wall 1103 and insert wall 1108, and a second gap between a rightward receiving wall 1103 and insert wall 1108. The first gap can receive first tongue portion 714, and the second gap can receive second tongue portion 716. Female coupling 1102 can include clip teeth 904 extending transversely inward from receiving walls 1103 above receiving channel 1106. Clip teeth 904 can include inward ledges to hook around a corresponding feature of a male coupling 702, e.g., around tongue 710.

Figure 14:
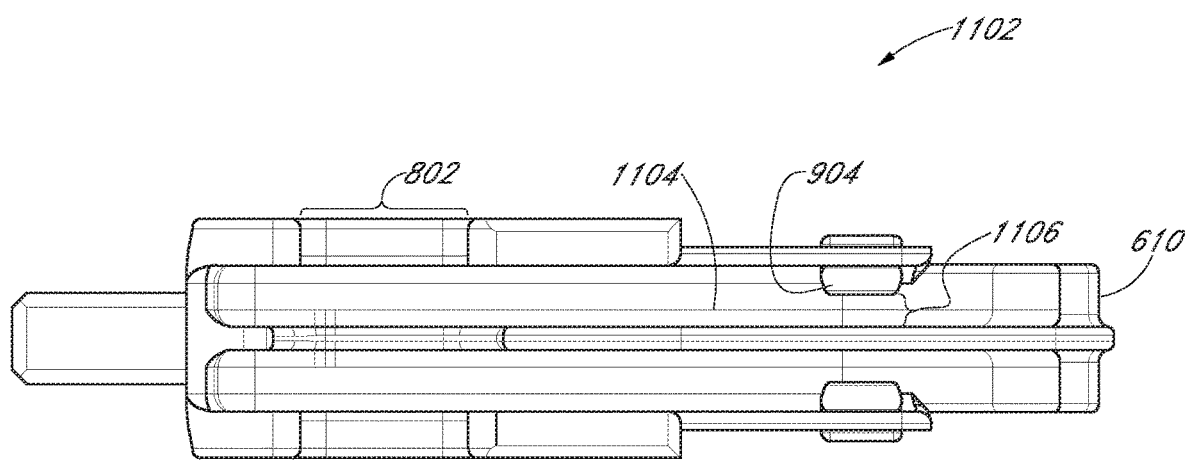
FIG. 14 illustrates a top view of a female coupling, in accordance with an embodiment of the present disclosure.

Referring to FIG. 14, a top view of a female coupling is shown in accordance with an embodiment of the present disclosure. The top view shows that, in an embodiment, receiving channel 1106 extends longitudinally from coupling tip 610 to intersect cable management channel 802. More particularly, receiving channel 1106 extends longitudinally over receiving floor 1104 to allow tongue 710 of male coupling 702 to insert into receiving channel 1106 and slide over receiving floor 1104 and under clip teeth 904 of female coupling 1102. Thus, when male coupling 702 is engaged with female coupling 1102, a male-to-female connection 404 is formed.

Figure 15A:
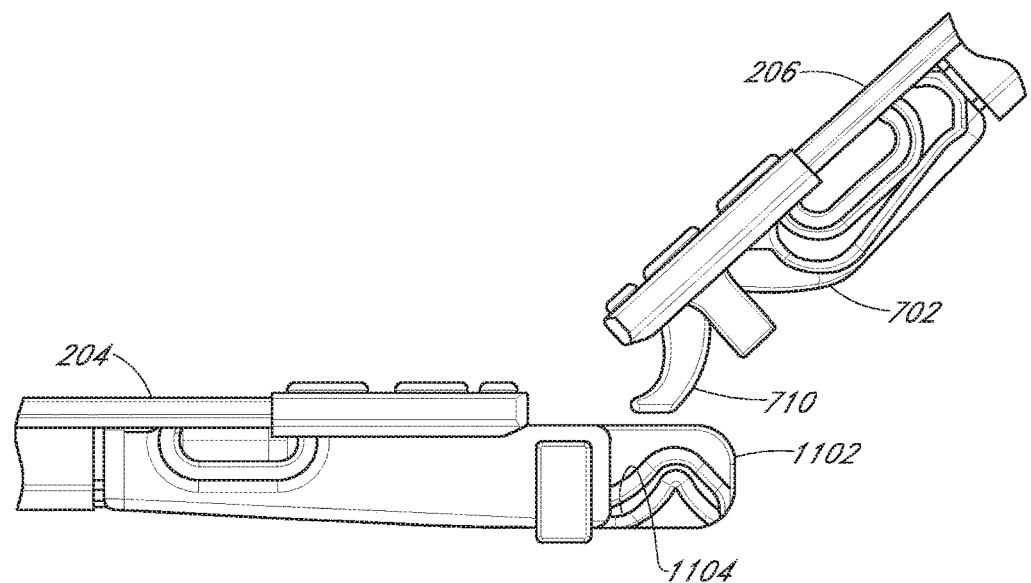
FIGS. 15A-15C illustrate a male coupling connecting to a female coupling using a first locking mode, in accordance with an embodiment of the present disclosure.

Referring to FIG. 15A, a male coupling connecting to a female coupling using a first locking mode is shown in accordance with an embodiment of the present disclosure. The first locking mode can be a tongue and groove locking mechanism. More particularly, the locking mechanism can involve tongue 710 of male coupling 702 sliding into receiving channel 1106 of female coupling 1102. In an embodiment, keystone module 204 includes female coupling 1102 and first lateral module 206 includes male coupling 702. Tongue 710 of male coupling 702 can be lowered into receiving channel 1106, e.g., onto receiving floor 1104 of female coupling 1102. First lateral module 206 can be inserted at an angle such that a longitudinal axis extending through a support rail of first lateral module 206 is oblique to a longitudinal axis extending through a support rail of keystone module 204.

Figure 15B:
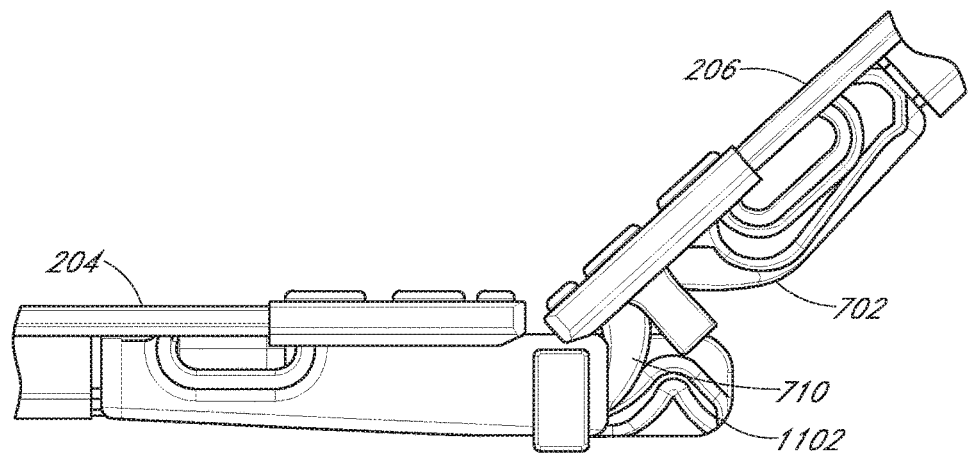

Referring to FIG. 15B, tongue 710 can hook under clip teeth 904 (hidden) of female coupling 1102. Accordingly male coupling 702 can engage female coupling 1102. The engagement between the couplings 520 can include a pivoting relationship between tongue 710 and clip teeth 904. That is, first lateral module 206 can be raised or lowered to change an angle between the respective lateral planes of respective PV laminates 214.

Figure 15C:
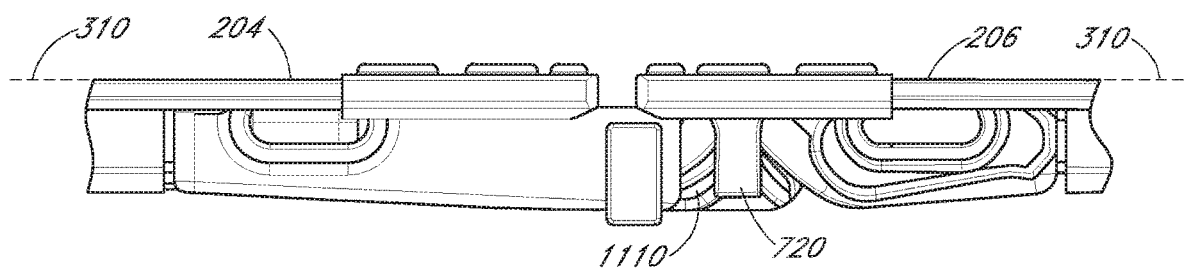

Referring to FIG. 15C, when first lateral module 206 is lowered such that respective lateral planes 310 are parallel in a horizontal direction, clip walls 720 of male coupling 702 can extend around locking knuckle 1110 of female coupling 1102. For example, clip teeth 904 on clip walls 720 can slide around an outside of locking knuckle 1110, causing clip walls 720 to flex outward until the ledges of clip teeth 904 are lower than a ridgeline of locking knuckle 1110. When the clip teeth 904 are below the ridgeline, clip walls 720 can flex inward to secure the ledges of clip teeth 904 under locking knuckle 1110. Accordingly, when male coupling 702 forms male-to-female connection 404 with female coupling 1102, tongue 710 can be mounted on locking knuckle 1110, and coupling tip 610 of male coupling 702 can be in receiving channel 1106 of female coupling 1102. Furthermore, clip walls 720 of male coupling 702 can extend from tongue 710 around locking knuckle 1110 of female coupling 1102. Thus, male coupling 702 can snap onto female coupling 1102 to form an interconnection between keystone module 204 and first lateral module 206.

Figure 16A:
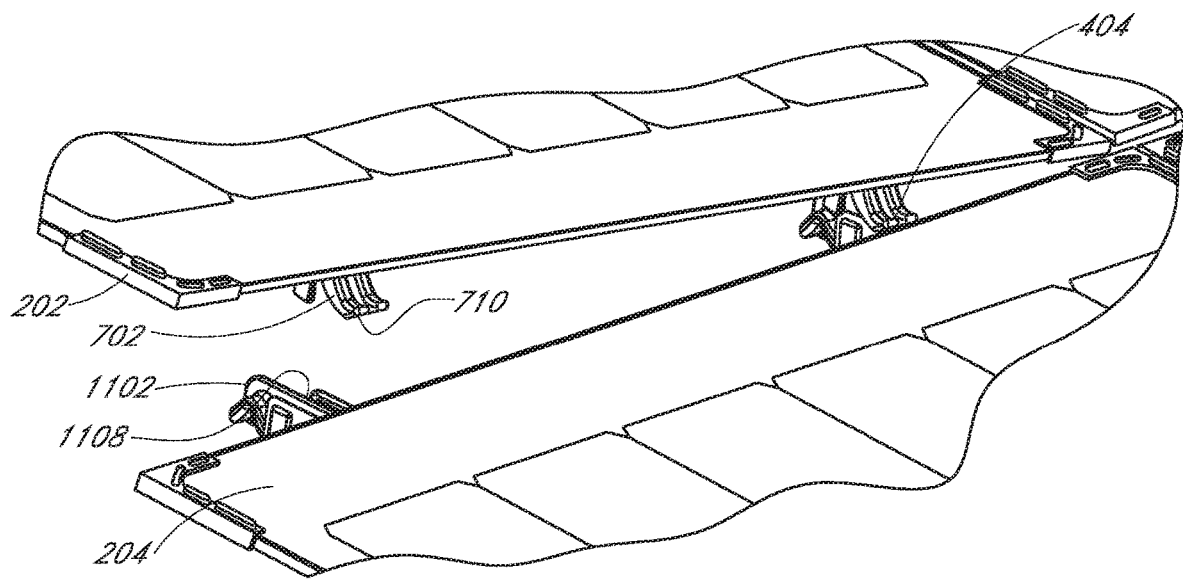
FIGS. 16A-16B illustrate a male coupling connecting to a female coupling using a second locking mode, in accordance with an embodiment of the present disclosure.

Referring to FIG. 16A, a male coupling connecting to a female coupling using a second locking mode is shown in accordance with an embodiment of the present disclosure. The second locking mode can be a snap locking mechanism. More particularly, the locking mechanism can involve male coupling 702 lowering onto and snapping over female coupling 1102. In an embodiment, keystone module 204 includes female coupling 1102 and a lateral PV module 202 includes male coupling 702. Tongue 710 of male coupling 702 can be lowered over insert wall 1108 of female coupling 1102. More particularly, the lateral PV module 202 can pivot about a first male-to-female connection 404 to cause the lateral plane 310 of the lateral PV module 202 to parallel the lateral plane 310 of keystone module 204.

Figure 16B:
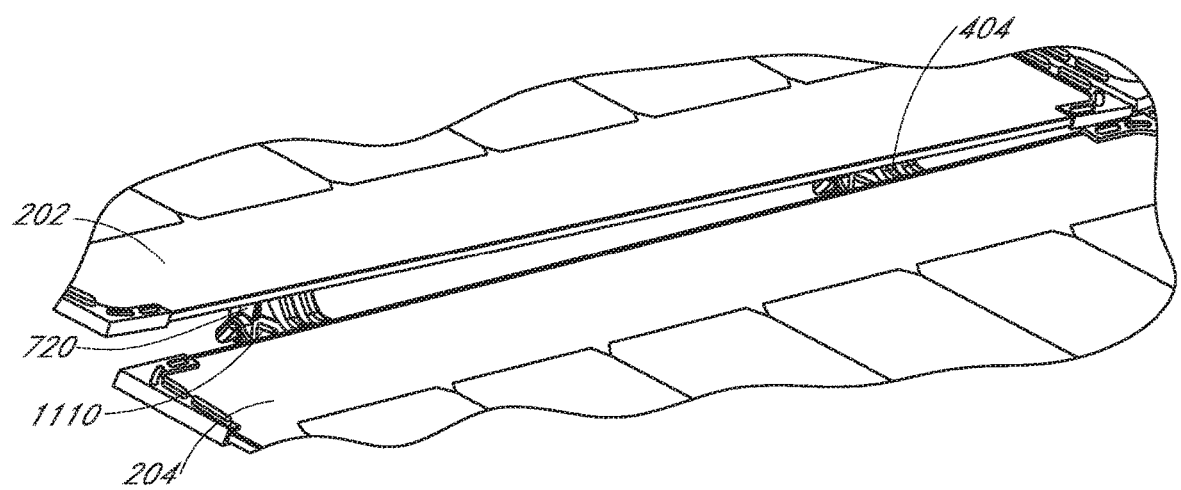

Referring to FIG. 16B, as the lateral PV module 202 lowers, clip walls 720 of male coupling 702 can extend around locking knuckle 1110 of female coupling 1102. For example, clip teeth 904 on clip walls 720 can slide around an outside of locking knuckle 1110, causing clip walls 720 to flex outward until the ledges of clip teeth 904 are lower than a ridgeline of locking knuckle 1110. When the clip teeth 904 are below the ridgeline, clip walls 720 can flex inward to secure the ledges of clip teeth 904 under locking knuckle 1110. Accordingly, male coupling 702 of the lateral PV module 202 can snap onto female coupling 1102 of keystone module 204 to form an interconnection between keystone module 204 and the lateral PV module 202.

It will be appreciated that, although male-to-female connection 404 can be achieved by different locking mechanisms, e.g., via tongue and groove locking or snap locking, the interconnection between adjacent PV modules 202 can be stiff and rigid. Interference between portions of male coupling 702 and female coupling 1102 can provide stability. For example, clip walls 720 snapped around locking knuckle 1110 can provide rotational stability about the longitudinal axis passing through the joined support rails. Similarly, receiving walls 1103 extending around tongue 710 can provide rotational stability. Receiving walls 1103 and insert wall 1108 also provide lateral stability to the joint. For example, tongue 710 remains stabilized, within receiving channel 1106, in a transverse direction relative to the longitudinal axis. Axial stability, e.g., stability in the longitudinal direction is provided by interference between locking knuckle 1110 and tongue 710. More particularly, the arcuate profiles of tongue 710 and locking knuckle 1110 can interfere to limit axial movement of male coupling 702 relative to female coupling 1102 after the couplings are snapped together. Accordingly, male-to-female connections 404 formed by engagement between male coupling 702 and female coupling 1102 can be stable and rigid.

Figure 17:
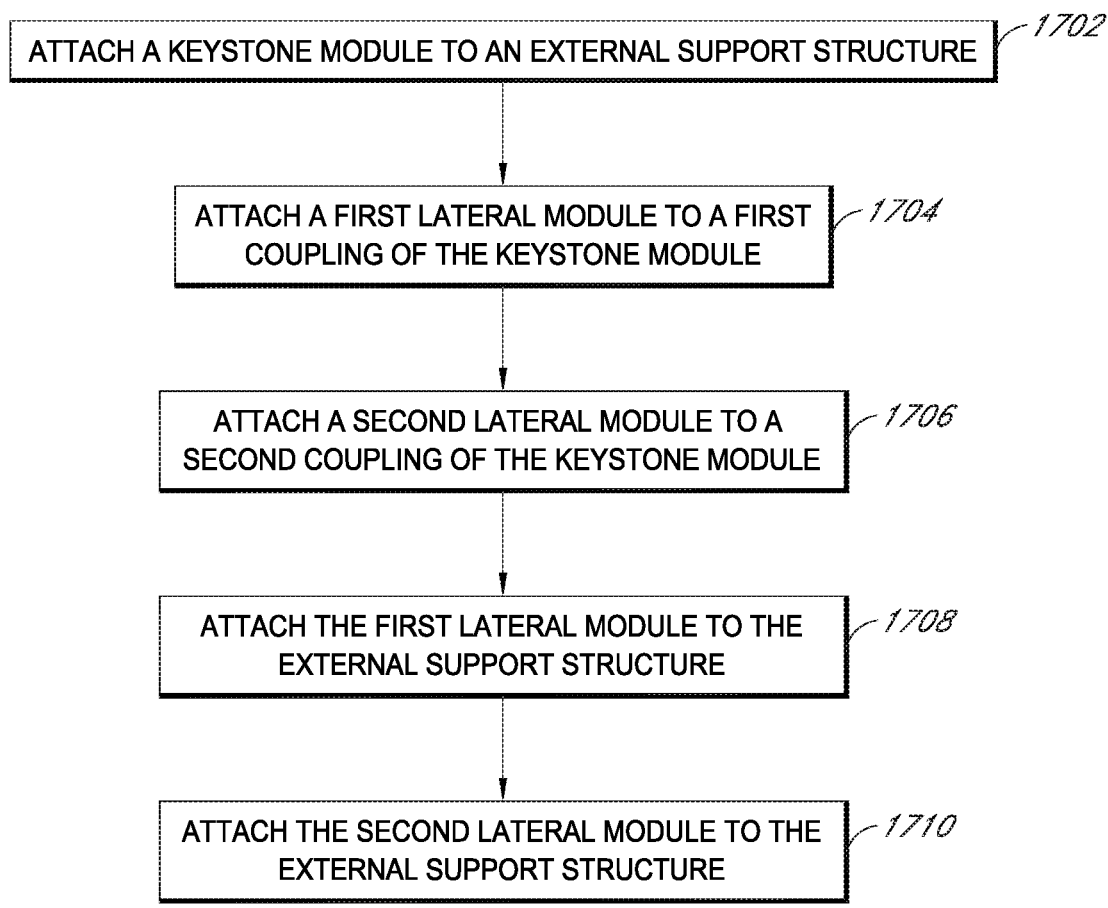
FIG. 17 illustrates a flowchart of a method of assembling a photovoltaic module assembly having bi-directionally connected photovoltaic modules, in accordance with an embodiment of the present disclosure.
Figure 18A:
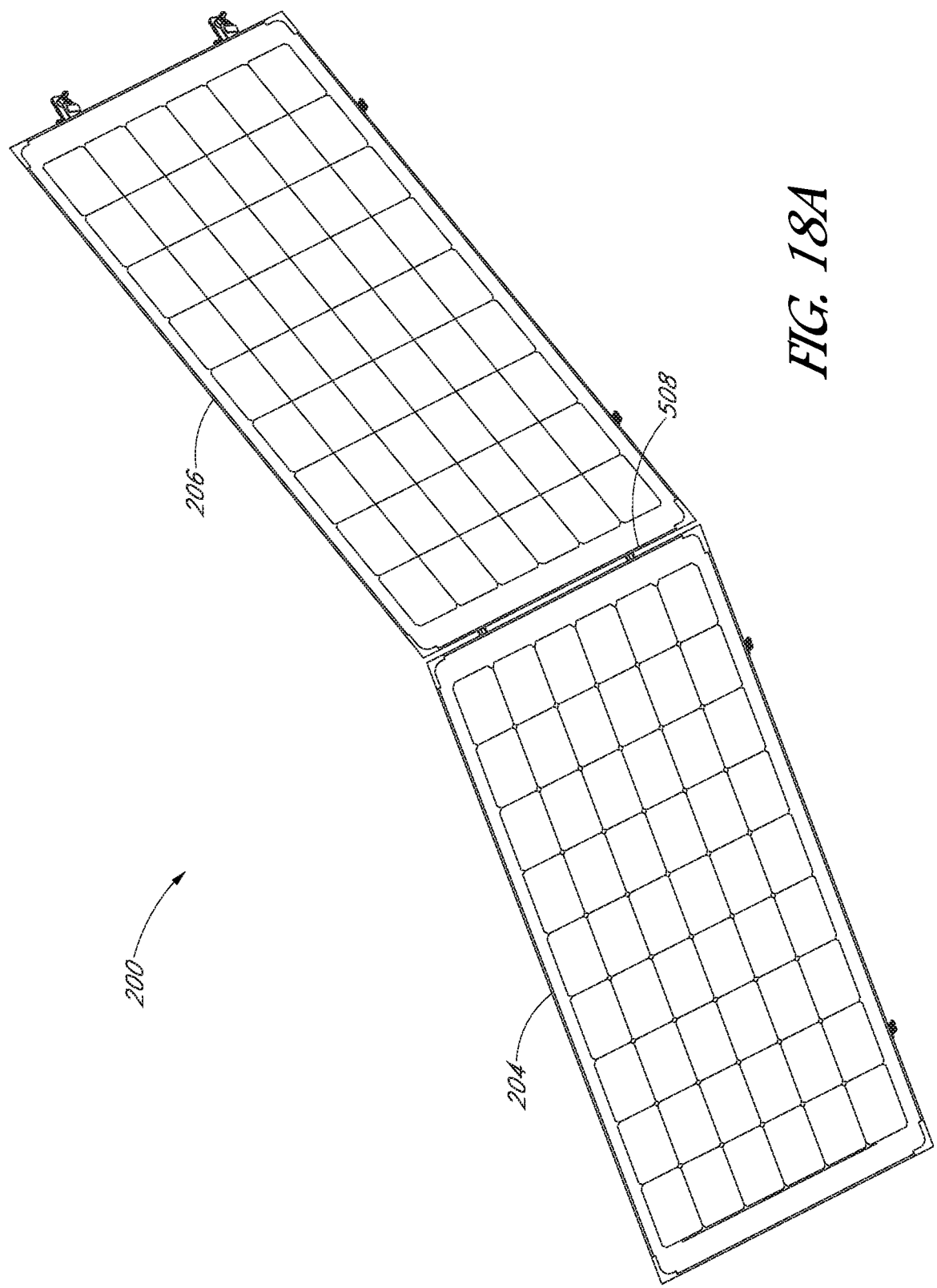
FIGS. 18A-18C illustrate operations in a method of assembling a photovoltaic module assembly having bi-directionally connected photovoltaic modules, in accordance with an embodiment of the present disclosure.
Figure 18B:
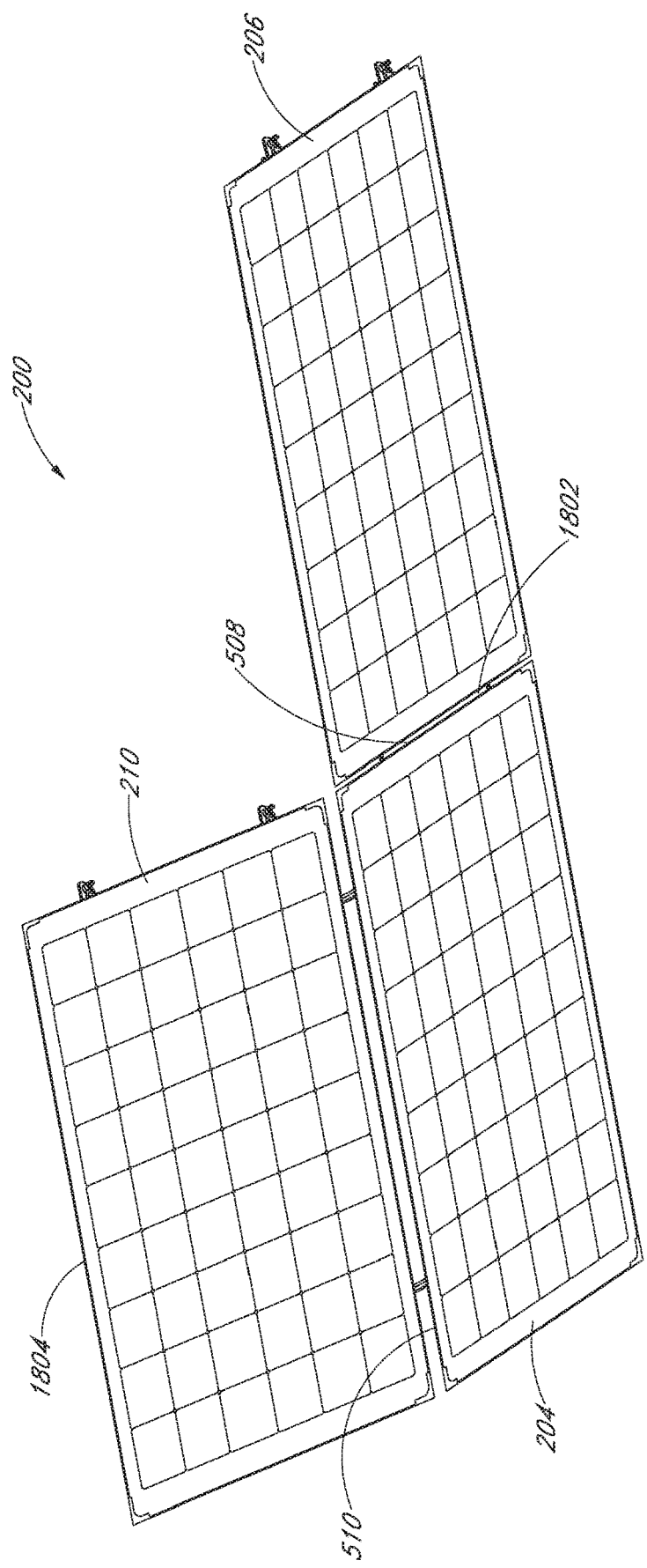
Figure 18C:
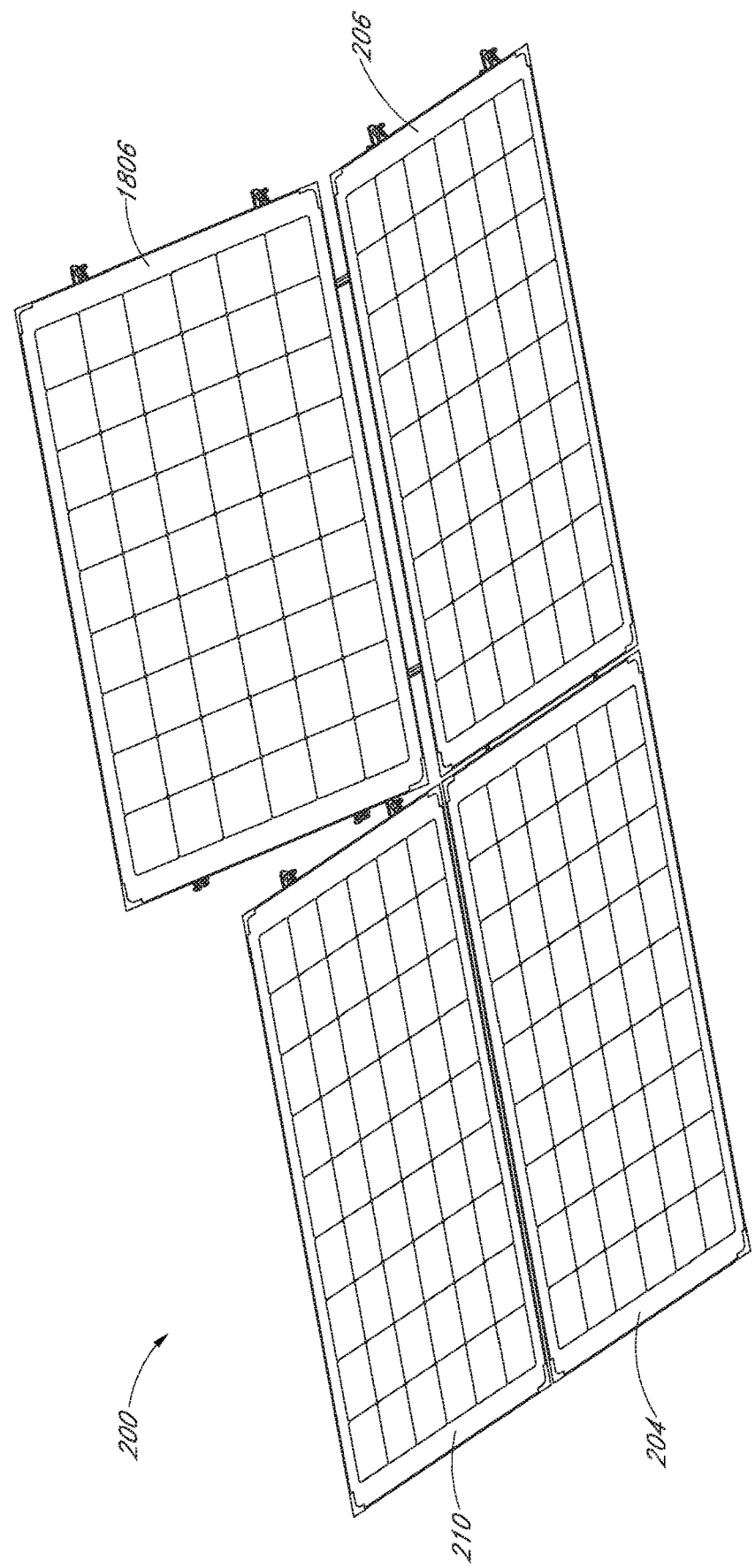

Referring to FIG. 17, a flowchart of a method of assembling a photovoltaic module assembly having bi-directionally connected photovoltaic modules is shown in accordance with an embodiment of the present disclosure. FIGS. 18A-18C illustrate operations in the method of FIG. 17, and thus, FIGS. 17-18C are described in combination below.

At operation 1702, keystone module 204 is attached to an external support structure, e.g., a roof. As described above, keystone module 204 can be attached to the external support structure by a first number of brackets 406. For example, two brackets can be used to attach support frame 402 of keystone module 204 to the roof.

At operation 1704, first lateral module 206 is attached to first coupling 522 of keystone module 204. Referring to FIG. 18A, first lateral module 206 can be coupled to keystone module 204 using a tongue and groove locking mechanism (FIGS. 15A-15C). Accordingly, first coupling 522 can be under first edge 508 of keystone module 204, and can receive a corresponding coupling 520 on first lateral module 206. For example, first lateral module 206 can include a male coupling 702 having tongue 710, and first coupling 522 can be female coupling 1102 having a receiving channel 1106 between receiving walls 1103. Tongue 710 can be inserted into receiving channel 1106 to attach first lateral module 206 to first coupling 522.

In an embodiment, keystone module 204 includes first coupling 522 and third coupling 526, and both first coupling 522 and third coupling 526 are female couplings 1102. Accordingly, first lateral module 206 can include a pair of male couplings 702 to engage the pair of female couplings 1102 on keystone module 204. The male couplings 702 of first lateral module 206 can be mounted on the female couplings 1102 of keystone module 204.

At operation 1706, second lateral module 210 is attached to second coupling 524 of keystone module 204. Referring to FIG. 18B, second lateral module 210 can be coupled to keystone module 204 using a tongue and groove locking mechanism (FIGS. 15A-15C). Accordingly, second coupling 524 can be under second edge 510 of keystone module 204 orthogonal to first edge 508, and can receive a corresponding coupling 520 on second lateral module 210. For example, second lateral module 210 can include a male coupling 702 having tongue 710, and second coupling 524 can be female coupling 1102 having a receiving channel 1106 between receiving walls 1103. Tongue 710 can be inserted into receiving channel 1106 to attach second lateral module 210 to second coupling 524.

In an embodiment, keystone module 204 includes second coupling 524 and fourth coupling 528, and both second coupling 524 and fourth coupling 528 are male couplings 702. Accordingly, second lateral module 210 can include a pair of female couplings 1102 to engage the pair of male couplings 702 on keystone module 204. More particularly, the female couplings 1102 of second lateral module 210 can be mounted on the male couplings 702 of keystone module 204.

Each PV module 202 of PV module assembly 200 can be separated from an adjacent module by a gap. For example, PV module assembly 200 can include a first gap 1802 between first edge 508 of keystone module 204 and an adjacent edge of first lateral module 206. Similarly, PV module assembly 200 can include a second gap 1804 between second edge 510 of keystone module 204 and an adjacent edge of second lateral module 210. The male-to-female connections 404, however, allow adjacent PV modules 202 to be mounted closely together. That is, the tongue and groove connection scheme described above permits an adjacent module to rock or pivot into place next to an adjoining module. The gaps between modules can be on an order of less than 100 mm. for example, first gap 1802 and second gap 1804 can have respective gap distances between module edges within a range of 1-10 mm, e.g., 3-4 mm.

At operation 1708, first lateral module 206 is attached to the external support structure. First lateral module 206 can be attached to the roof by a second number of brackets. At operation 1710, second lateral module 210 is attached to the external support structure. Second lateral module 210 can be attached to the roof by a third number of brackets. In an embodiment, the first number of brackets attaching keystone module 204 to the roof is more than the second number of brackets and the third number of brackets. For example, first lateral module 206 and second lateral module 210 can be attached to the roof by a single respective bracket.

Referring to FIG. 18C, PV module assembly 200 can include a terminal module 1806 attached to first lateral module 206 and second lateral module 210. Terminal module 1806 can connect to first lateral module 206 and second lateral module 210 along two axes using an underlying support frame 402. More particularly, the support frame 402 of terminal module 1806 can connect to first lateral module 206 along a lower edge, and the support frame 402 of terminal module 1806 can connect to second lateral module 210 along a left edge. In an embodiment, terminal module 1806 attaches to first lateral module 206 using a tongue and groove locking mechanism (FIGS. 15A-15C), and terminal module 1806 attaches to second lateral module 210 using a snap locking mechanism (FIGS. 16A-16B). The different locking mechanisms can allow couplings 520 of terminal module 1806 along the lower edge to engage first lateral module 206 at an angle and then be lowered down to drop couplings 520 of terminal module 1806 along the left edge onto corresponding couplings of second lateral module 210. When terminal module 1806 is flat, e.g., when all lateral planes 310 of PV module assembly 200 are parallel to each other, the PV modules 202 can be snapped together to form a rigidly connected module assembly. The PV module assembly 200 can distribute loading throughout the array structure, including distributing vertical loading applied to the roof at bracket attachments. As such, mounting points for the PV modules 202 can be distributed optimally over an entire area of the module array, and loading on each PV module 202 can be shared with adjacent PV modules 202.

Figure 19:
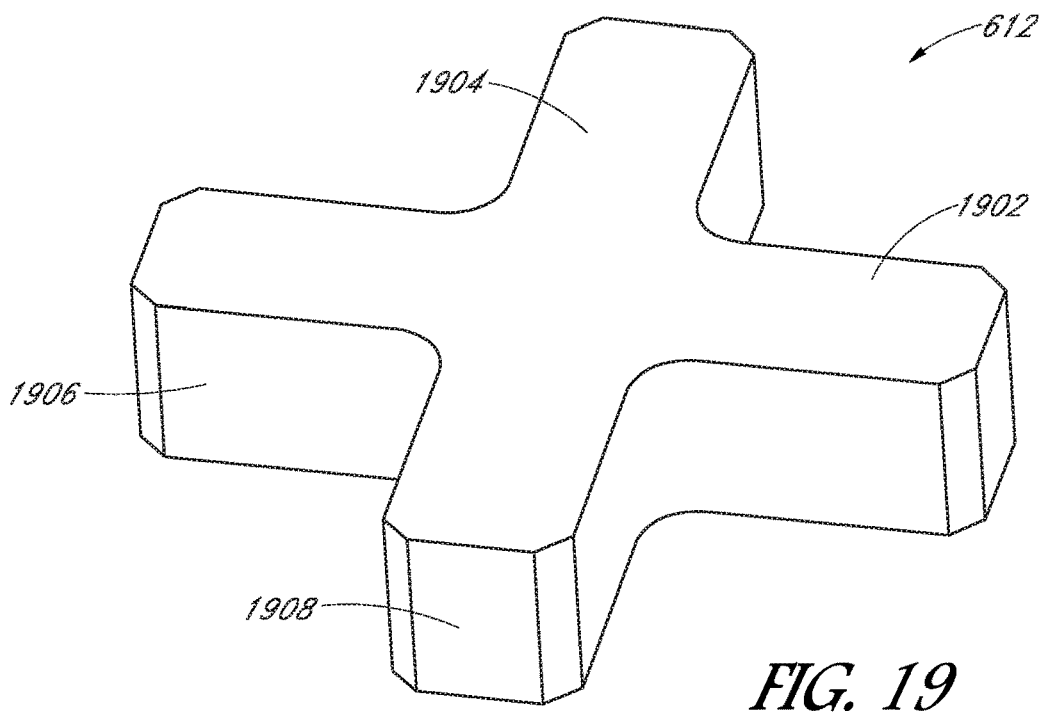
FIG. 19 illustrates a perspective view of a rail coupler, in accordance with an embodiment of the present disclosure.

Referring to FIG. 19, a perspective view of a rail coupler is shown in accordance with an embodiment of the present disclosure. Rail coupler 612 can join one or more support rails. For example, rail coupler 612 can include a first coupler prong 1902 to attach to first support rail 502, and a second coupler prong 1904 to attach to second support rail 504. First coupler prong 1902 can extend orthogonal to second coupler prong 1904. Rail coupler 612 can have a tee shape, and thus, first coupler prong 1902 can extend across a central axis passing through a center of rail coupler 612 to an opposite prong end. Similarly, second coupler prong 1904 can extend across the central axis to an opposite prong end. In an embodiment, the opposite prong ends can be ends of additional coupler prongs, e.g., a third coupler prong 1906 and a fourth coupler prong 1908. Accordingly, the tee-shaped rail coupler 612 can engage inward ends of several support rails and/or support rail segments of support frame 402. To engage, the prongs can be inserted into a tubular channel of the support rail(s).

Figure 20:
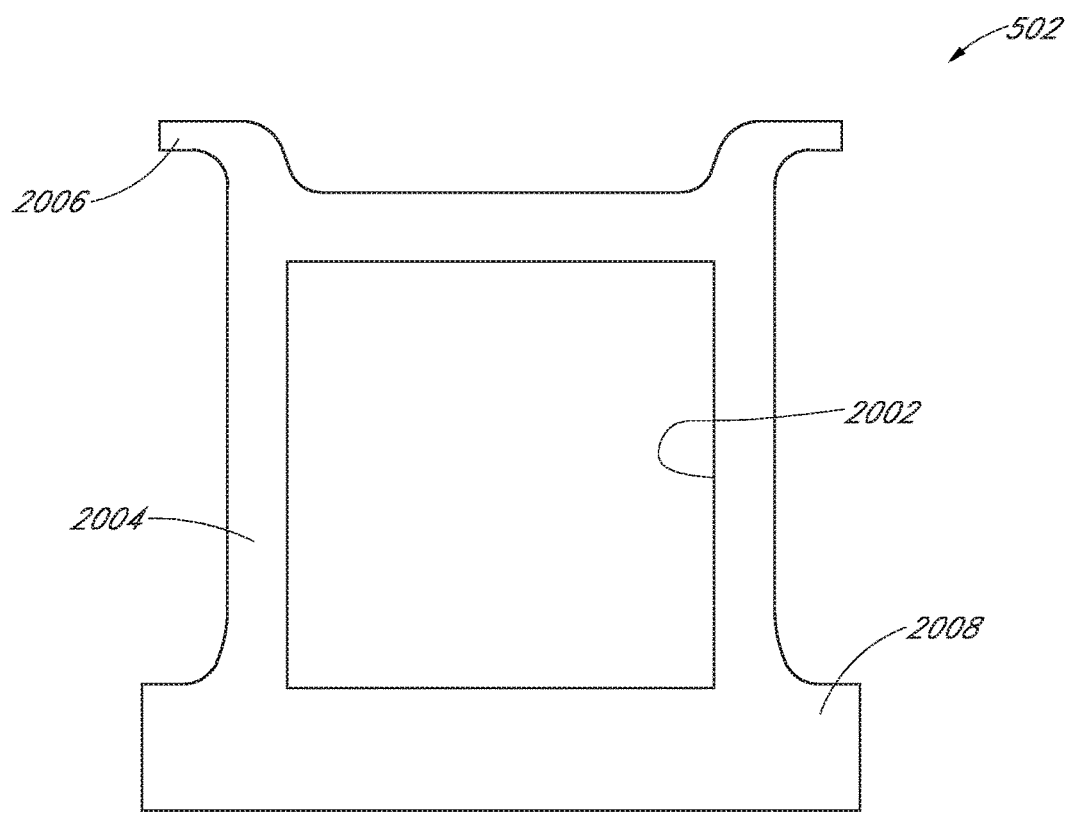
FIG. 20 illustrates a cross-sectional view of a support rail, in accordance with an embodiment of the present disclosure.

Referring to FIG. 20, a cross-sectional view of a support rail is shown in accordance with an embodiment of the present disclosure. Support rails of support frame 402 can be tubular. For example, first support rail 502 can include a longitudinal channel 2002 within a rail wall 2004. Rail wall 2004 can be a cylindrical tubular wall, a rectangular tubular wall, or any other shape of tubular wall. In an embodiment, the support rail can have a cross-sectional area that includes an upper flange 2006 and a lower flange 2008. The flanges give the support rail an I-beam shape. The I-beam shaped tube can be hollow, e.g., a rectangular longitudinal channel 2002 can extend longitudinally through the I-beam shaped tube.

In an embodiment, rail coupler 612 is inserted into longitudinal channel 2002 to secure rail coupler 612 to support frame 402. For example, first coupler prong 1902 of first coupling 522 can be mounted in longitudinal channel 2002 of first support rail 502 to attach first coupler prong 1902 to first inward end 602. Similarly, second coupler prong 1904 can be inserted into another longitudinal channel 2002 of second support rail 504 to attach second coupler prong 1904 to second inward end 606. Accordingly, longitudinal channel 2002 can be a receptacle to receive rail coupler 612 for joining the support rail to another support rail.

In an embodiment, support rails can be adhered to PV laminate 214. For example, an adhesive material, such as a glue or and encapsulant material, can be disposed between the support rail and back surface 314. Alternatively, support rails can be attached to PV laminate 214 by mechanical fasteners such as screws, rivets, clips, etc.

Figure 21:
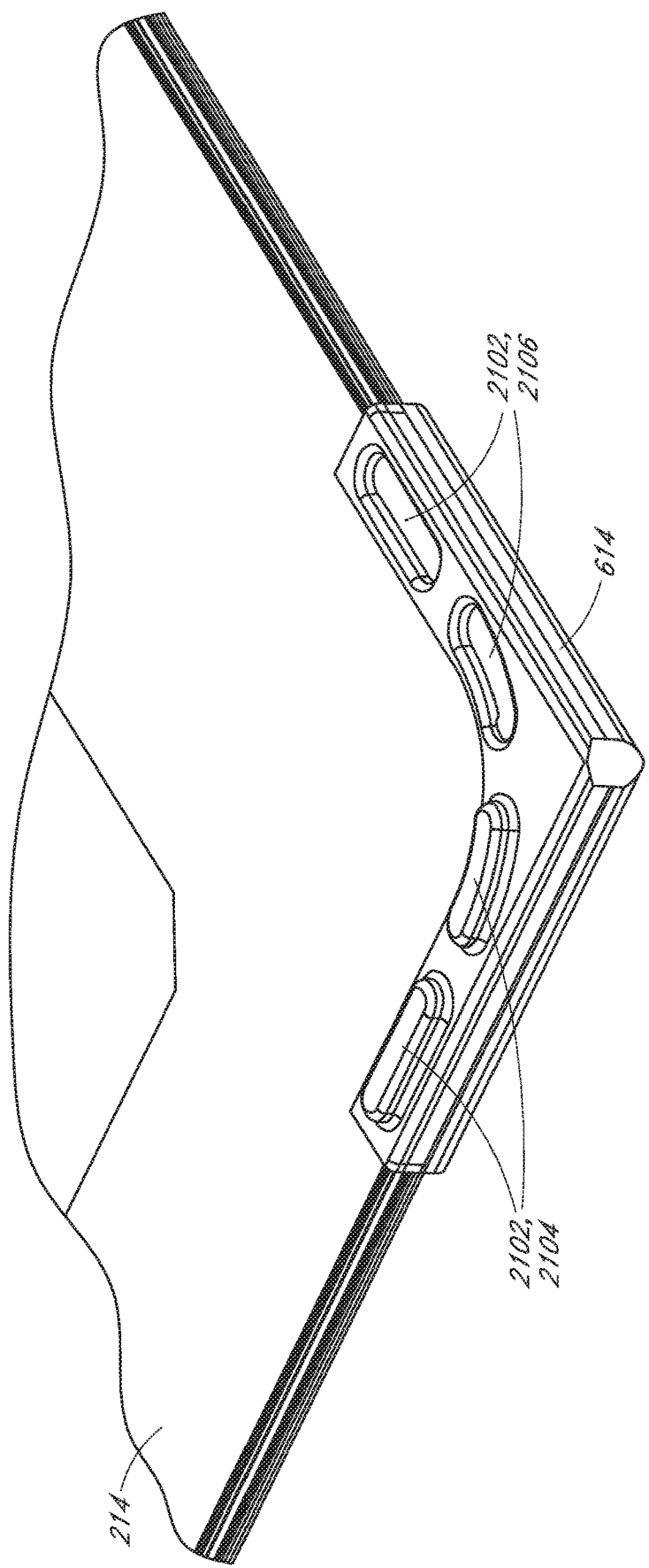
FIG. 21 illustrates a perspective view of a corner region of a photovoltaic module having a stackable edge protector, in accordance with an embodiment of the present disclosure.

Referring to FIG. 21, a perspective view of a corner region of a photovoltaic module having a stackable edge protector is shown in accordance with an embodiment of the present disclosure. Edge protector 614 can have an internal recess to receive corner 506 of PV laminate 214. Edge protector 614 can be fabricated from a shock resistant material, and thus, can protect PV laminate 214 during shipping and/or installation.

In an embodiment, edge protector 614 includes one or more vertical interlock features 2102. For example, vertical interlock feature 2102 can be a vertical boss 2104 extending upward from a top surface of edge protector 614. Alternatively, vertical interlock feature 2102 can be a vertical recess 2106 extending downward from the top surface of edge protector 614. Vertical interlock features 2102 can engage each other when PV modules 202 are stacked. More particularly, an edge protector 614 on the corner 506 of a first stacked module can mesh with an edge protector 614 on the corner 506 of a second stacked module. Vertical bosses 2104 of one edge protector 614 can engage vertical recesses 2106 of another edge protector 614. Vertical bosses 2104 can be nested within vertical recesses 2106 such that lateral movement is resisted. When a lateral load is applied to the first stacked module, mechanical interference between vertical bosses 2104 and vertical recesses 2106 can prevent the first stacked module from moving laterally relative to the second stacked module.

The components of PV module 202 can be fabricated from various materials. For example, support rails and/or rail couplers 612 can be fabricated from aluminum, e.g., die-cast aluminum. By contrast, edge protector 614 can be fabricated from a polymer, e.g., a molded polymer. Such material choices are offered by way of example, however, and the components can be formed from different materials. For example, rail couplers 612 can be fabricated from a polymer.

A PV module having bi-directional couplings is described. Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A photovoltaic module system comprising:

a first photovoltaic laminate; and a second photovoltaic laminate;

wherein each of the first and second photovoltaic laminates has a perimeter and a support frame mounted on a back surface of the laminate, the support frame positioned completely within the perimeter of the associated first or second photovoltaic laminate, wherein each support frame of the first and second photovoltaic laminates comprises a plurality of support frame members, wherein at least two of the support frame members of the first and second photovoltaic laminates intersect and form cantilevered ends extending past their intersection, the cantilevered ends each having a first distal end, and wherein the first distal end of the support frame member from the first photovoltaic laminate is coupled to the first distal end of the support frame member from the second photovoltaic laminate with a first mechanical coupling pair from a plurality of mechanical coupling pairs.

2. The photovoltaic module system of claim 1 wherein the first mechanical coupling pair includes a male coupling and a female coupling.

3. The photovoltaic module system of claim 2 wherein the male mechanical coupling comprises a forked tongue, the forked tongue comprising two separated tongue portions, each separated tongue portion ending in a coupling tip.

4. The photovoltaic module system of claim 3 wherein the female mechanical coupling comprises two receiving channels, the receiving channels spaced apart from each other and sized and shaped to each receive at least a coupling tip from one of the separated tongue portions of the male mechanical coupling.

5. The photovoltaic module system of claim 2 wherein the male mechanical coupling is secured to the female mechanical coupling with a forked tongue distal end of the male mechanical coupling positioned within receiving walls of the female mechanical coupling.

6. The photovoltaic module system of claim 1 further comprising:

a third photovoltaic laminate; and a fourth photovoltaic laminate, wherein each of the third and fourth photovoltaic laminates has a perimeter and a support frame mounted on a back surface of the laminate, the support frame positioned completely within the perimeter of the associated third or fourth photovoltaic laminate, wherein each support frame of the third and fourth photovoltaic laminates comprises a plurality of support frame members, wherein at least two of the support frame members of the third and fourth photovoltaic laminates intersect and form cantilevered ends extending past their intersection, the cantilevered ends each having a distal end, and wherein the distal end of the support frame member from the third photovoltaic laminate is coupled to the distal end of the support frame member from the fourth photovoltaic laminate with a second mechanical coupling pair from the plurality of mechanical coupling pairs.

7. The photovoltaic module system of claim 6 wherein a shape and size of the first mechanical coupling pair and the shape and size of the second mechanical coupling pair mimic each other.

8. A photovoltaic module system comprising:
a first photovoltaic laminate; and
a second photovoltaic laminate;
   wherein each of the first and second photovoltaic laminates has a perimeter and a support frame mounted on a back surface of the laminate,
   wherein each support frame comprises a plurality of support frame members,
   wherein at least two of the support frame members of each photovoltaic laminate intersect and form cantilevered ends extending past their intersection, the cantilevered ends each having a distal end, and
   wherein the distal end of the support frame member from the first photovoltaic laminate is coupled to the distal end of a support frame member from the second photovoltaic laminate with a bi-directional mechanical coupling pair, the mechanical coupling pair comprising a male mechanical coupling with a tongue that extends beyond the perimeter of the first photovoltaic laminate.

9. The photovoltaic module system of claim 8 wherein the bi-directional mechanical coupling pair comprises the male mechanical coupling and a female mechanical coupling.

10. The photovoltaic module system of claim 9 wherein the tongue of the male mechanical coupling is forked.

11. The photovoltaic module system of claim 9 wherein the female mechanical coupling comprises two receiving channels separated by an insert wall and a cable management recess forming a channel through the receiving channels and the insert wall.

12. The photovoltaic module system of claim 9 wherein the female mechanical coupling comprises two receiving channels separated by an insert wall.

13. The photovoltaic module system of claim 9 wherein a distal end of the female mechanical coupling comprises a locking knuckle.

14. A photovoltaic module system comprising:
a first photovoltaic laminate;
a second photovoltaic laminate;
a third photovoltaic laminate; and
a fourth photovoltaic laminate,
   wherein each of the first, second, third and fourth photovoltaic laminates has a perimeter and a support frame mounted on a back surface of the laminate, the support frame positioned completely within the perimeter of the associated first or second or third or fourth photovoltaic laminate,
   wherein each support frame of the first, second, third and fourth photovoltaic laminates comprises a plurality of support frame members,
   wherein at least two of the support frame members of the first, second, third and fourth photovoltaic laminates have a distal end extending from a cantilevered portion of the support frame member, and
   wherein the distal end extending from a cantilevered portion of the support frame member comprises a first mechanical coupling or a second mechanical coupling of a pair of mechanical couplings.

15. The photovoltaic module system of claim 14 wherein during assembly the first photovoltaic laminate, the second photovoltaic laminate and the third photovoltaic laminate are connected to each other in a planar fashion via pairs of first male mechanical coupling and second female mechanical couplings prior to the connection of the fourth photovoltaic laminate to the first photovoltaic laminate and the third photovoltaic laminate via pairs of first male mechanical coupling and second female mechanical coupling.

16. The photovoltaic module system of claim 15 wherein the first male mechanical coupling includes a forked tongue at a distal end.

17. The photovoltaic module system of claim 14 wherein the perimeter is rectangular.

18. The photovoltaic module system of claim 14 wherein the first mechanical coupling includes a coupler insert at a proximal end of the first mechanical coupling, the coupler sized and shaped to secure to a support frame member.

19. The photovoltaic module system of claim 14 wherein the first mechanical coupling and the second mechanical coupling each comprise a cable management channel oriented across a width of the first mechanical coupling and a width of the second mechanical coupling.

20. The photovoltaic module system of claim 19 wherein the cable management channel has an oblong configuration.

* * * * *